INVENTOR
PETER WILLIAM WARD
BY
ATTORNEY

INVENTOR
Peter William Ward
BY
[signature]
ATTORNEY

INVENTOR
Peter William Ward
BY
[signature]
ATTORNEY

Aug. 6, 1957 P. W. WARD 2,802,057

AUTOMATIC TELEPHONE EXCHANGES

Filed Dec. 1, 1953 15 Sheets-Sheet 4

INVENTOR
PETER WILLIAM WARD
BY
[signature]
ATTORNEY

INVENTOR
Peter William Ward
BY
[signature]
ATTORNEY

AUTOMATIC TELEPHONE EXCHANGES

Filed Dec. 1, 1953 15 Sheets-Sheet 6

INVENTOR

PETER WILLIAM WARD

BY

[signature]

ATTORNEY

INVENTOR
Peter William Ward
BY
[signature]
ATTORNEY

Aug. 6, 1957 P. W. WARD 2,802,057

AUTOMATIC TELEPHONE EXCHANGES

Filed Dec. 1, 1953 15 Sheets-Sheet 8

INVENTOR

Peter William Ward

BY

[illegible signature]

ATTORNEY

INVENTOR

Peter William Ward

BY

ATTORNEY

INVENTOR

Peter William Ward

BY

[signature]

ATTORNEY

INVENTOR

Peter William Ward

BY

ATTORNEY

INVENTOR

Peter William Ward

BY

ATTORNEY

Aug. 6, 1957 P. W. WARD 2,802,057

AUTOMATIC TELEPHONE EXCHANGES

Filed Dec. 1, 1953 15 Sheets-Sheet 13

INVENTOR
Peter William Ward
BY
[signature]
ATTORNEY

INVENTOR
PETER WILLIAM WARD
BY
[signature]
ATTORNEY

Aug. 6, 1957 | P. W. WARD | 2,802,057

AUTOMATIC TELEPHONE EXCHANGES

Filed Dec. 1, 1953 | 15 Sheets-Sheet 15

INVENTOR
PETER WILLIAM WARD
BY
ATTORNEY

United States Patent Office 2,802,057

Patented Aug. 6, 1957

2,802,057

AUTOMATIC TELEPHONE EXCHANGES

Peter William Ward, Wembley, England, assignor to The General Electric Company Limited, London, England Application December 1, 1953, Serial No. 395,391

Claims priority, application Great Britain December 3, 1952

14 Claims. (Cl. 179—15)

Figure 1A:
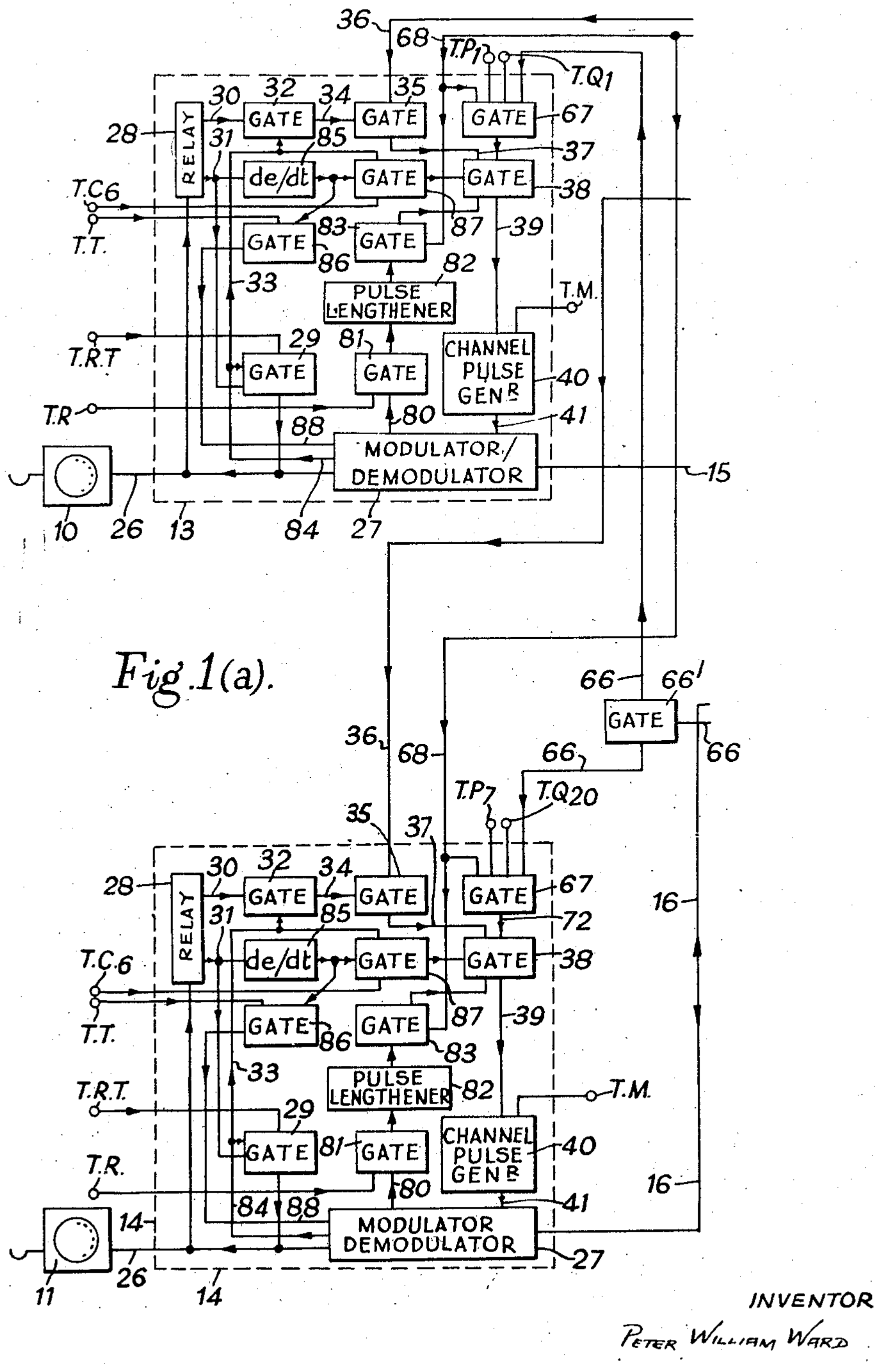
Figure 1B:
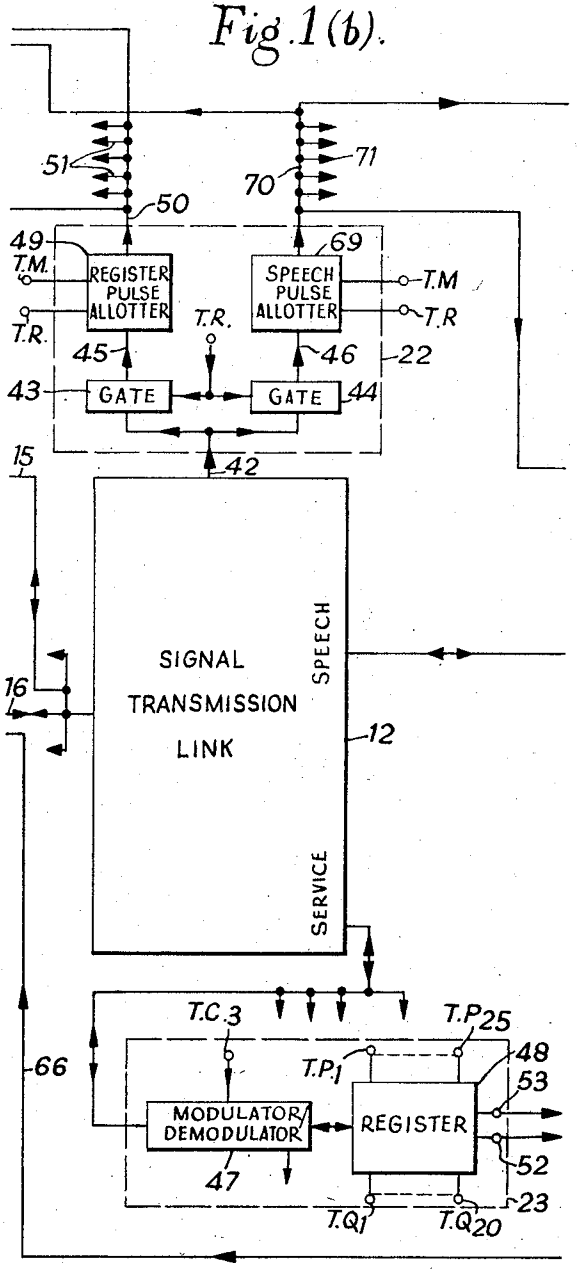
Figure 1C:
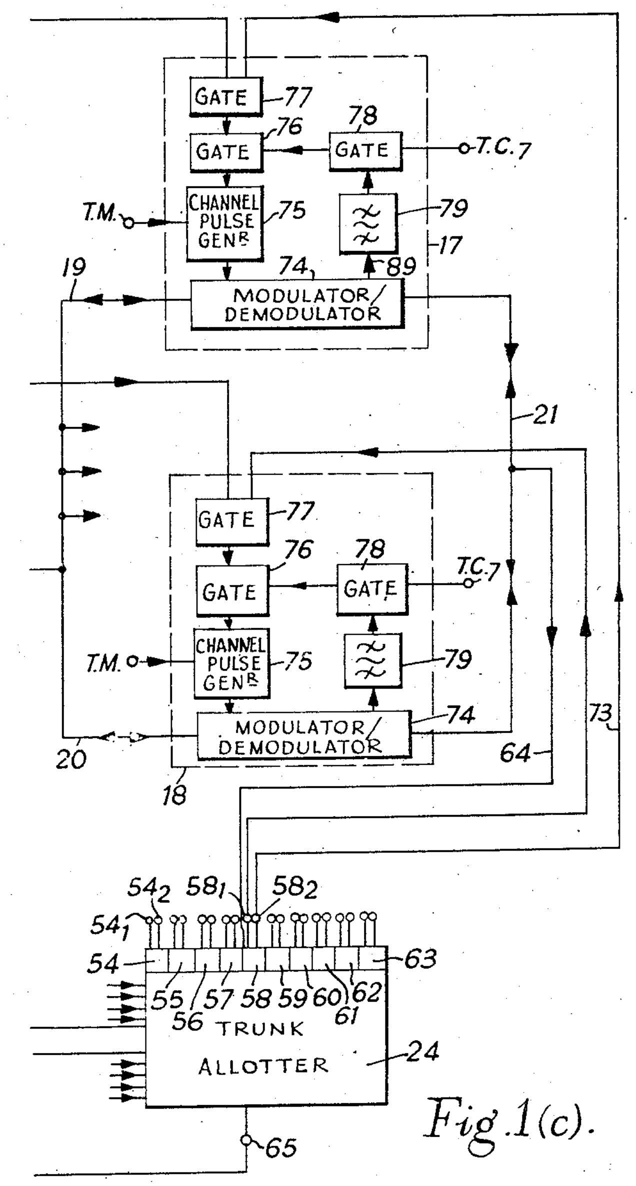

The present invention relates to automatic telephone exchanges and is concerned with the type of telephone exchange usually referred to as an electronic automatic telephone exchange. An electronic automatic telephone exchange is an automatic telephone exchange in which at least a large part of the switching effected in the speech paths is carried out by electronic switches, that is to say switches in which switching operations are performed by electron discharge devices, metal rectifiers or the like instead of by mechanical means.

The electronic switches so far proposed for use in electronic automatic telephone exchanges usually take one of two forms namely (*a*) electronic switches each analogous to a simple "on-off" switch and (*b*) electronic switches in the form of multiplex switching units. A multiplex switching unit is a unit having two groups of terminals and circuit elements connecting the two groups of terminals and adapted to carry different signal voltages in the form of modulations of carriers of different characteristics respectively. Thus several carrier voltages are provided by a suitable source or sources and are modulated in any suitable manner. The carrier voltages may be oscillations of different frequencies in which case the multiplex switching unit is referred to as a frequency division multiplex switching unit. On the other hand the carrier voltages may be pulse trains, the several pulse trains being interlaced with one another. The multiplex switching unit is then referred to as a time division multiplex switching unit and the modulations may take one of several forms, for example variations in amplitude, variations in width or variations in the time positions of the pulses. Other forms of modulation such as pulse code modulation may also be employed.

The present invention is concerned with electronic automatic telephone exchanges in which only multiplex switching units need be employed for switching speech paths.

Automatic exchanges, of a type which provide a nominal number of 10,000 lines connected to different subscribers' instruments each of which is identified by a four digit code, will now be considered.

By way of example, an exchange will be considered which will give an adequate service when an average of 1000 subscribers are simultaneously busy during a peak period. This figure has been chosen since it gives rise to convenient numbering in the description.

It is usually thought undesirable to construct a multiplex switching unit of more than about 100 speech channels because of engineering difficulties in preventing cross-talk and for other considerations.

With this assumption in mind and making a further assumption that there are to be no switches for carrying speech voltages other than multiplex switching units it is thought to be impossible to design a 10,000 line exchange in which the speech path between any pair of calling and called subscribers does not extend through two or more multiplex switching units in tandem. The phrase "two multiplex switching units in tandem" includes the case where a multiplex switching unit is traversed twice. It can be shown that with present day engineering techniques at least 10 multiplex switching units must be provided to carry an average of 1000 simultaneous calls satisfactorily.

It has already been proposed to provide an electronic automatic telephone exchange using multiplex switching units in which subscribers are connected in groups to a plurality of multiplex switching units, different groups of subscribers being connected to different multiplex switching units and each of the several subscribers in each group being allotted permanently one of the channels in the multiplex switching unit to which he is connected.

Thus in a 10,000 line exchange of this kind there must be at least 100 of such multiplex switching units. Furthermore the output of each of these multiplex switching units must have access to the subscribers on each of the other 99 multiplex switching units. In order to provide a reasonable grade of service there must therefore be at least 300 outlets from each multiplex switching unit. In this arrangement it is theoretically possible to arrange that in the connection between any two subscribers only two multiplex switching units need be connected in tandem. Such an arrangement requires, however, in addition to the 100 multiplex switching units at least 40,000 modulators and demodulators and 30,000 channel pulse generators.

A similar system has been proposed in which the several subscribers in each group are not allotted permanent channels in the multiplex switching unit to which they are connected but the trunk terminating units at the outlets of the multiplex switching units are allotted permanent channels in the multiplex switching unit. A trunk terminating unit is a unit in which voltage is applied to modulate a carrier for transmission in the multiplex switching unit, and in which a receiver is provided to select a carrier transmitted in the multiplex switching unit. The output of the receiver is applied, for example to another trunk terminating unit or an outgoing junction. Assuming such as arrangement to be employed in an automatic exchange with 10,000 subscribers, that *n* multiplex switching units are employed to which the subscribers are connected in groups respectively where *n* is greater than 10 as previously described, then $10{,}000/n$ subscribers are connected to each multiplex switching unit and each multiplex switching unit carries $1{,}000/n$ trunk units. The output of each multiplex switching unit must be provided with a connection to each of the other multiplex switching units. Assuming each multiplex switching unit to provide 100 speech channels, then since the fixed channel pulses are allotted to the trunk terminating units there can be only 100 outlets from each multiplex switching unit. There can therefore be only $100/n$ trunk connections to each multiplex switching unit and each group of trunks must be capable of carrying $1{,}000/n^2$ traffic units. It is, however, impossible for $100/n$ trunk connections to carry $1{,}000/n^2$ traffic units with a reasonable grade of service for any value of *n*.

In such a system therefore it is necessary to employ further switching apparatus in order to provide a reasonable grade of service. Such further switching apparatus may for example comprise one or more multiplex switching units or switches of any suitable type.

It is undesirable to connect three or more multiplex switching units in tandem because of the increased liability of cross-talk and deterioration of the quality of the speech voltages.

One object of the present invention is to provide an electronic automatic telephone exchange employing multiplex switching units in which all switching of speech paths can be effected through multiplex switching units and in which no more than two multiplex switching units need ever be connected in tandem in establishing a speech path from any subscriber to any other subscriber on the exchange.

A further object of the present invention is to provide an electronic automatic telephone exchange whereby the aforesaid object can be met and in which the number of multiplex switching units that need be employed to provide a reasonable grade of service for a large number of subscribers may be relatively small, for example for 10,000 subscribers only 20 multiplex switching units need be used.

According to the present invention an automatic telephone exchange system comprises a plurality of telephone lines terminating in a plurality of line terminating units respectively in a telephone exchange, first connecting means connecting the line terminating units to one end of a signal-transmission link, second connecting means connecting the other end of the transmission link to two numerically equal groups of trunk terminating units, each of the line terminating units and each of the trunk terminating units including a modulator and a receiver, each of the subscribers' lines being connected to the input circuit of its associated modulator and to the output circuit of its associated receiver, the output circuit of the modulator and the input circuit of the receiver in each line terminating unit being connected by the said first means to the said one end of the link, the output circuit of the modulator and the input circuit of the receiver in each of the trunk terminating units being connected by the said second means to the said other end of the link, the trunk terminating units being connected together in pairs, each pair comprising a trunk terminating unit from each group and the output circuit of the receiver in each trunk terminating unit in a pair being connected to the input circuit of the modulator in the other trunk terminating unit in the pair, the modulator in each of the line terminating units and trunk terminating units having associated therewith a separate carrier source independently adjustable to generate any one of a plurality of different carriers, and each receiver being adjustable to select any one of the said carriers, and control means connected to all the line and trunk terminating units, the control means being responsive to a calling signal from any one of the subscribers' lines and representative of the number of any other of the subscribers' lines to adjust the carrier sources in the line terminating unit of the said one line and a disengaged one of the trunk terminating units in one of the groups to generate for transmission through their associated modulators to the link like carriers not already in use, to adjust the receivers associated with the last said modulators to select from the link the last said carriers, to adjust the carrier sources in the line terminating unit of the said other line and the trunk terminating unit paired with the said disengaged trunk terminating unit to generate for transmission through their associated modulators to the link further like carriers differing from the first said like carriers and not already in use, and to adjust the receivers associated with the last said modulators to select from the link the last said carriers. Thus the line terminating units and trunk terminating units, together with the signal transmission link constitute a multiplex switching unit.

The receivers in the line terminating units and trunk terminating units will usually comprise a demodulator whereby the output of the receiver is in the form of voltages at speech frequencies. In the case of the trunk terminating units, however, demodulation although preferable need not be effected. For example where the different carriers are in the form of pulses of different instants of occurrence, the receiver may comprise an adjustable gate device whereby pulses of any desired instants of occurrence can be selected from the link. Instead of demodulating the selected pulses to provide speech voltages for application to the modulator of the trunk terminating unit paired therewith, the pulses selected by the gate may for example merely be broadened to the full extent of the repetition period of the selected pulses and these broadened pulses applied to the input of the modulator in the paired trunk terminating unit.

Similarly, when the carriers are in the form of oscillations of different frequencies the receivers in the trunk terminating units will comprise a selective circuit tunable to select any of the carriers and the output instead of being demodulated to provide speech voltages for application to the paired trunk terminating unit may merely undergo a frequency changing step to provide output oscillations of another and different carrier frequency. The outputs of the receivers in the line terminating units will usually be in the form of speech voltages for application direct to the subscribers' lines.

Unlike the aforesaid proposed arrangements neither the line terminating units nor the trunk terminating units in the exchange are permanently allotted channels in the multiplex switching unit. On the contrary, on the origination of a call, the line terminating unit to which the calling signal is applied is allotted a free channel in the multiplex switching unit, a free one of the trunk terminating units is connected into that same channel, the corresponding trunk terminating unit in the other group of trunk terminating units, that is to say the trunk terminating unit to which the first said trunk terminating unit is connected, is allotted to a further free channel in the multiplex switching unit and the line terminating unit of the called subscriber is also allotted to that second free channel. Thus speech voltages from the calling subscriber to the called subscriber traverse the multiplex switching unit once in the first said free channel and a second time in the second free channel whereby the multiplex switching unit is traversed twice.

According to a feature of the invention the exchange comprises a further plurality of subscribers' lines terminating in a further plurality of line terminating units respectively, third connecting means connecting the further plurality of line terminating units to one end of a second signal-transmission link, fourth connecting means connecting the other end of the second transmission link to a third group of trunk terminating units, each of the further line terminating units, and each of the trunk terminating units in the third group comprising a modulator and a receiver, each of the further subscribers' lines being connected to the input circuit of its associated modulator and the output circuit of its associated receiver, the output circuit of the modulator and the input circuit of the receiver in each of the further line terminating units being connected by the said third connecting means to the said one end of the second link, the output circuit of the modulator and the input circuit of the receiver in each of the trunk terminating units in the third group being connected by the said fourth connecting means to the said other end of the second link, a fourth group of trunk terminating units each comprising a modulator and a receiver, the output circuits of the modulators and the input circuits of the receivers in the fourth group of trunk terminating units being connected by the said second connecting means to the said other end of the first-mentioned link, the trunk terminating units in the third and fourth groups being connected together in pairs, each pair comprising a trunk terminating unit from each of the third and fourth groups and the output circuit of the receiver in each trunk terminating unit in a pair being connected to the input circuit of the modulator in the other trunk terminating unit in the pair, the modulator in each of the further line terminating units and the trunk terminating units in the third group having associated therewith a separate carrier source independently adjustable to generate any one of a plurality of further different carriers, which may be identical with the first said carriers respectively, and the receiver in each of the two further line terminating units and the third group of trunk terminating units being adjustable to select any one of the said further carriers, the modulators in the fourth group of trunk terminating units each having associated therewith a separate carrier source independently adjustable to generate any one of the first said carriers and the receivers in the fourth group each being adjustable to select any one of the first said carriers, the said control means being connected to the further line terminating units and the third and fourth groups of trunk terminating units and being responsive to a calling signal from any one of the first said subscribers' lines and representative of any one of the further subscribers' lines to adjust the carrier sources in the line terminating unit of the line from which the calling signal is received and a disengaged one of the trunk terminating units in the fourth group to generate for transmission through their associated modulators to the first said link like carriers not already in use, to adjust the receivers associated with the last said modulators to select from the link the last said carriers, to adjust the carrier sources in the line terminating unit of the said one of the further lines and the trunk terminating unit in the third group paired with the said disengaged trunk terminating unit in the fourth group to generate for transmission through their associated modulators to the second link like ones of the said further carriers not already in use, and to adjust the receivers associated with the last said modulators to select from the second link the last said carriers. Thus it will be appreciated that an exchange according to the present invention uses multiplex switching arrangements of greater flexibility than in the aforesaid proposed arrangements and it is this greater degree of flexibility which enables simplication in the equipment used in the exchange to be effected.

Figure 1:
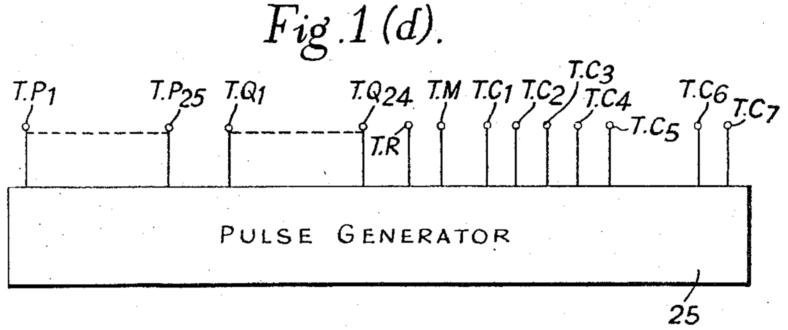
Figure 5:
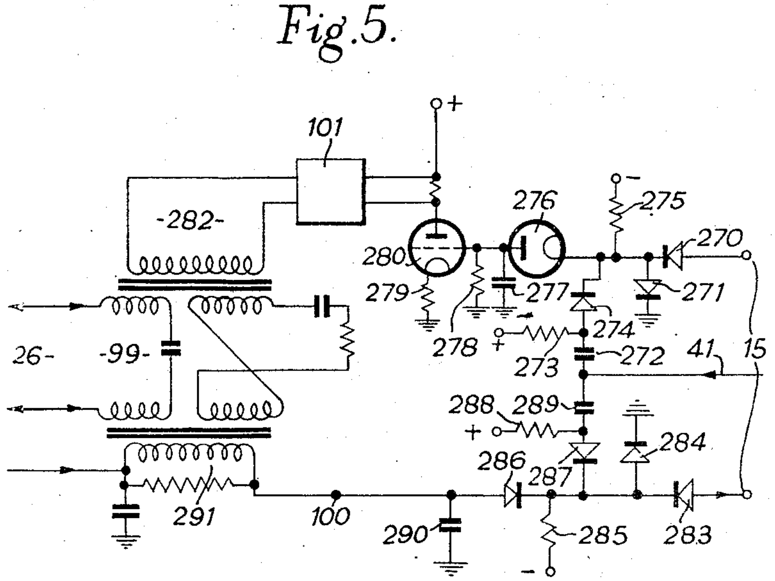
Figure 2:
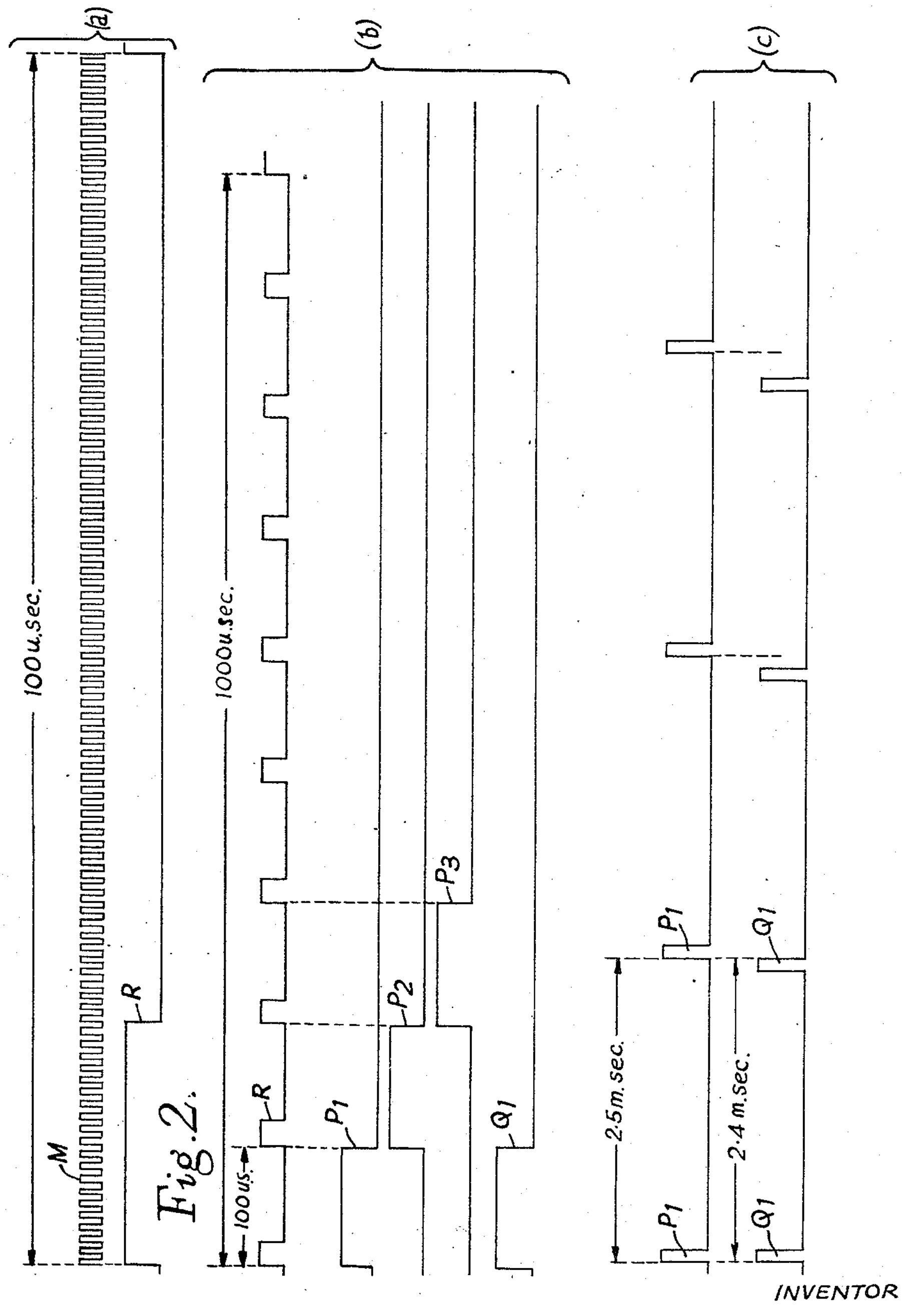
Figure 3:
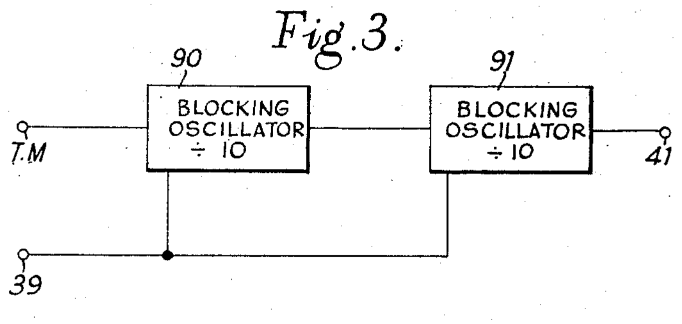
Figure 4:
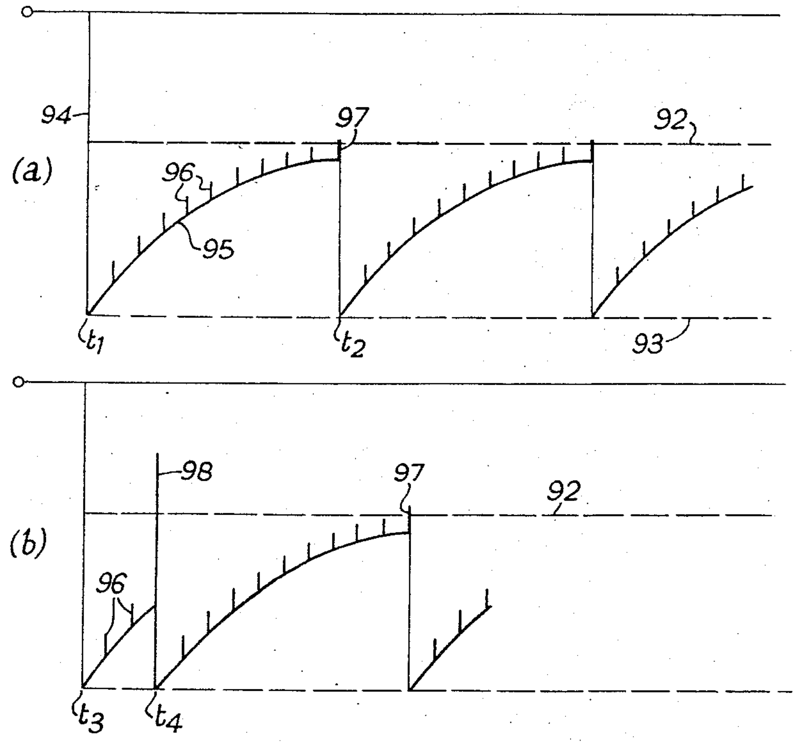
Figure 6:
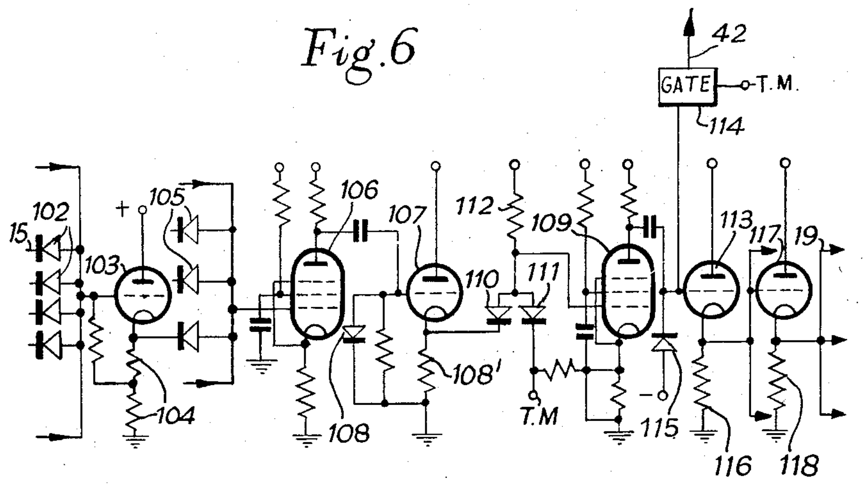
Figure 7:
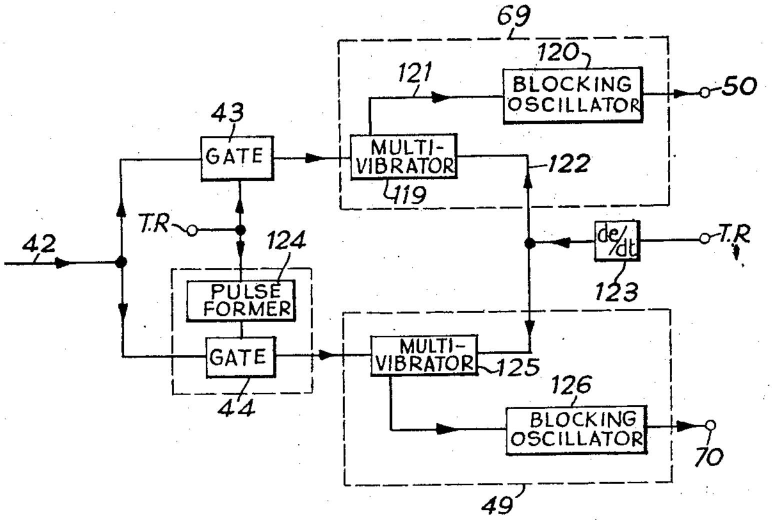
Figure 8A:
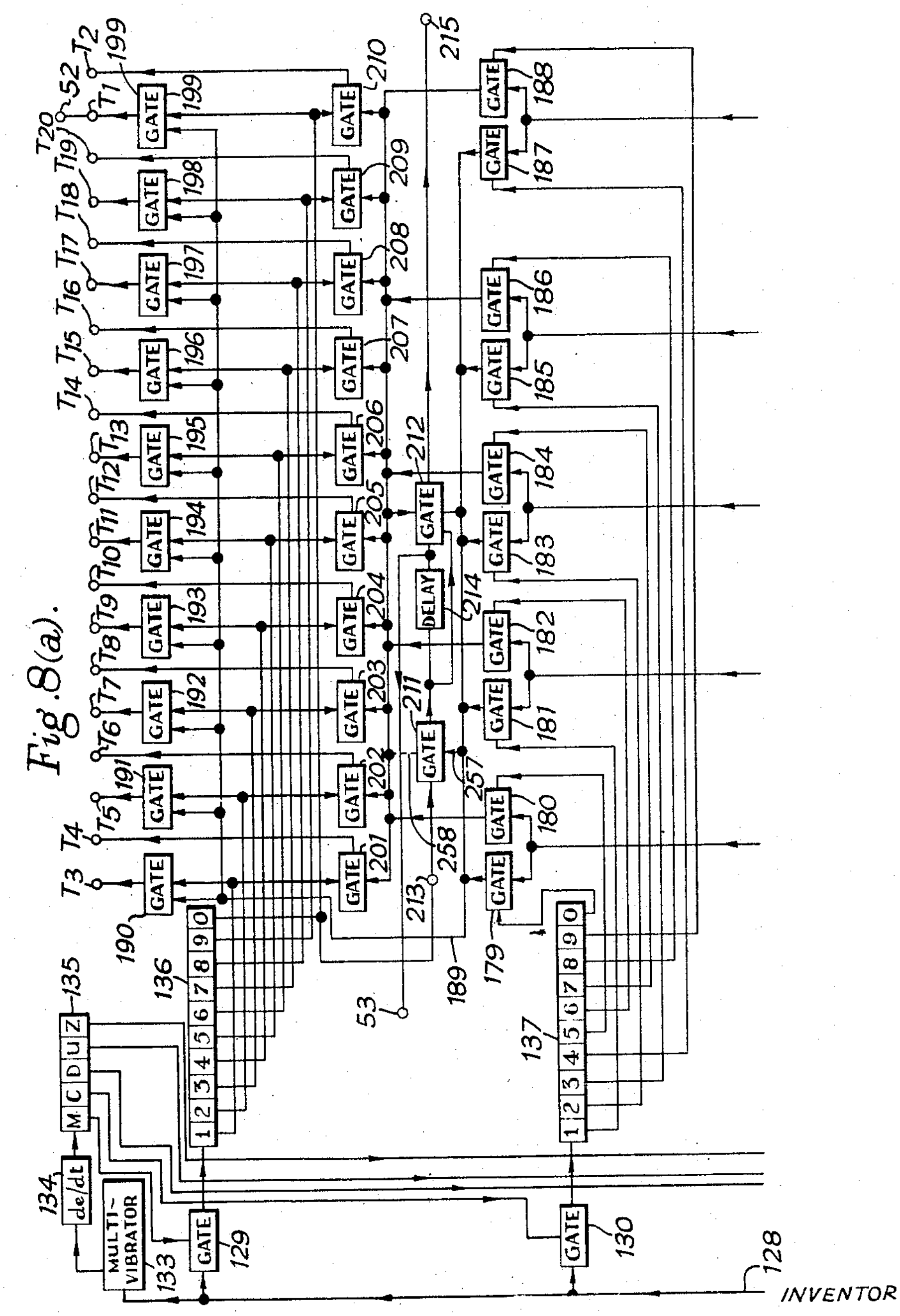
Figure 8B:
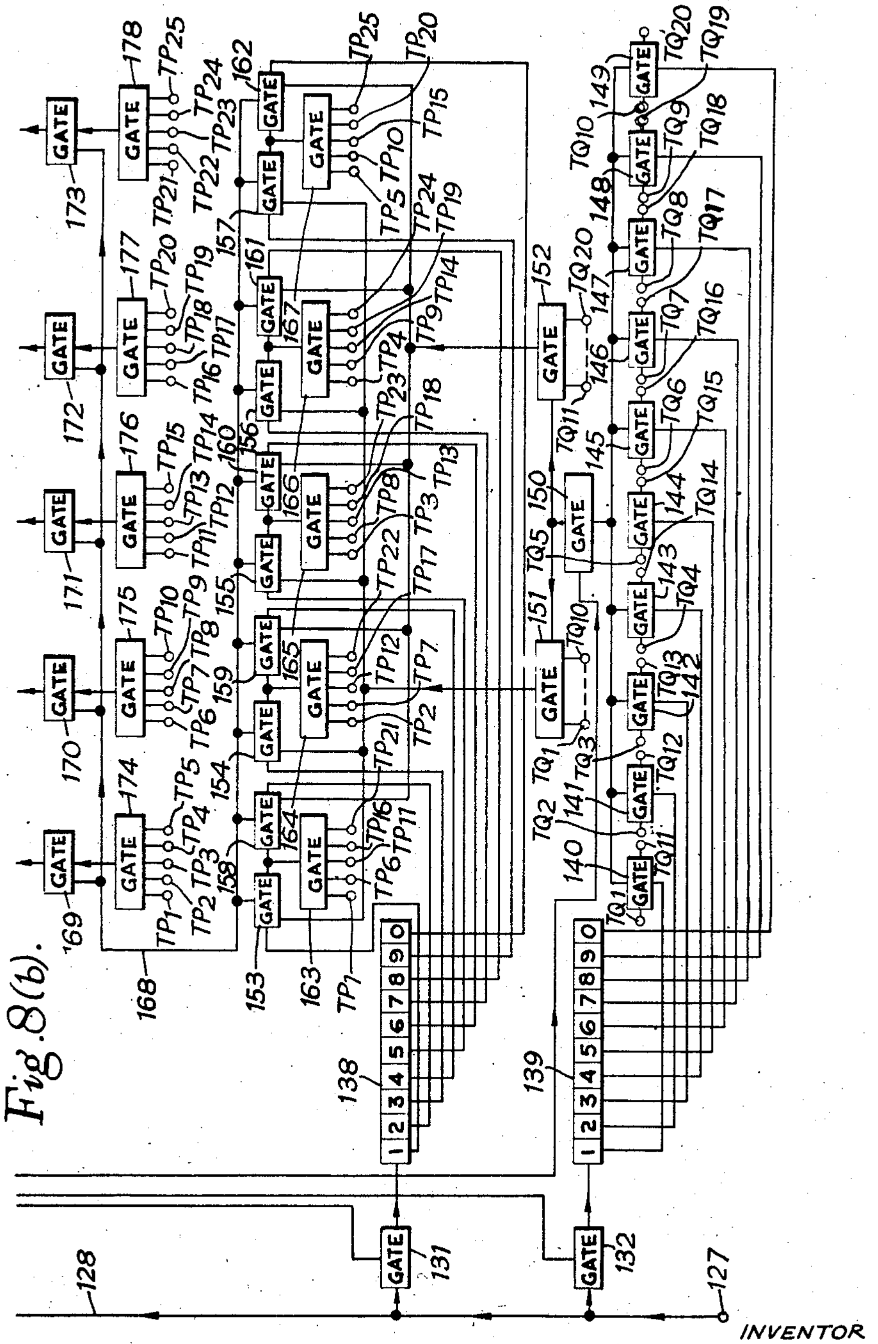
Figure 9:
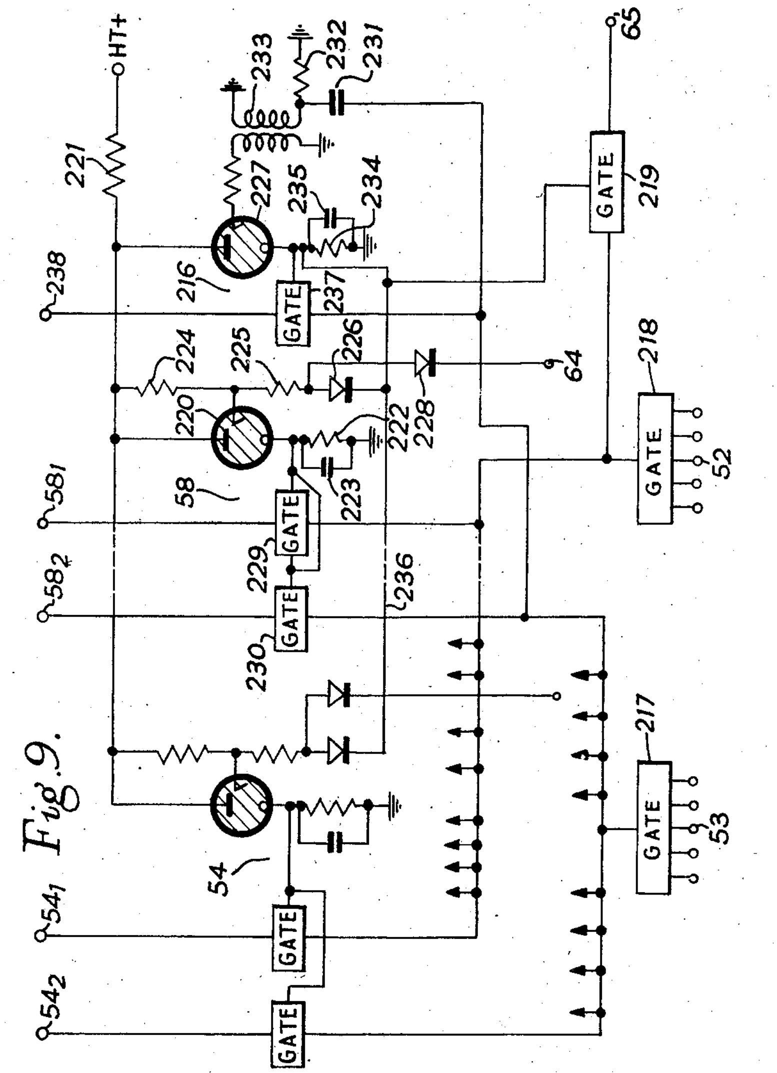
Figure 10A:
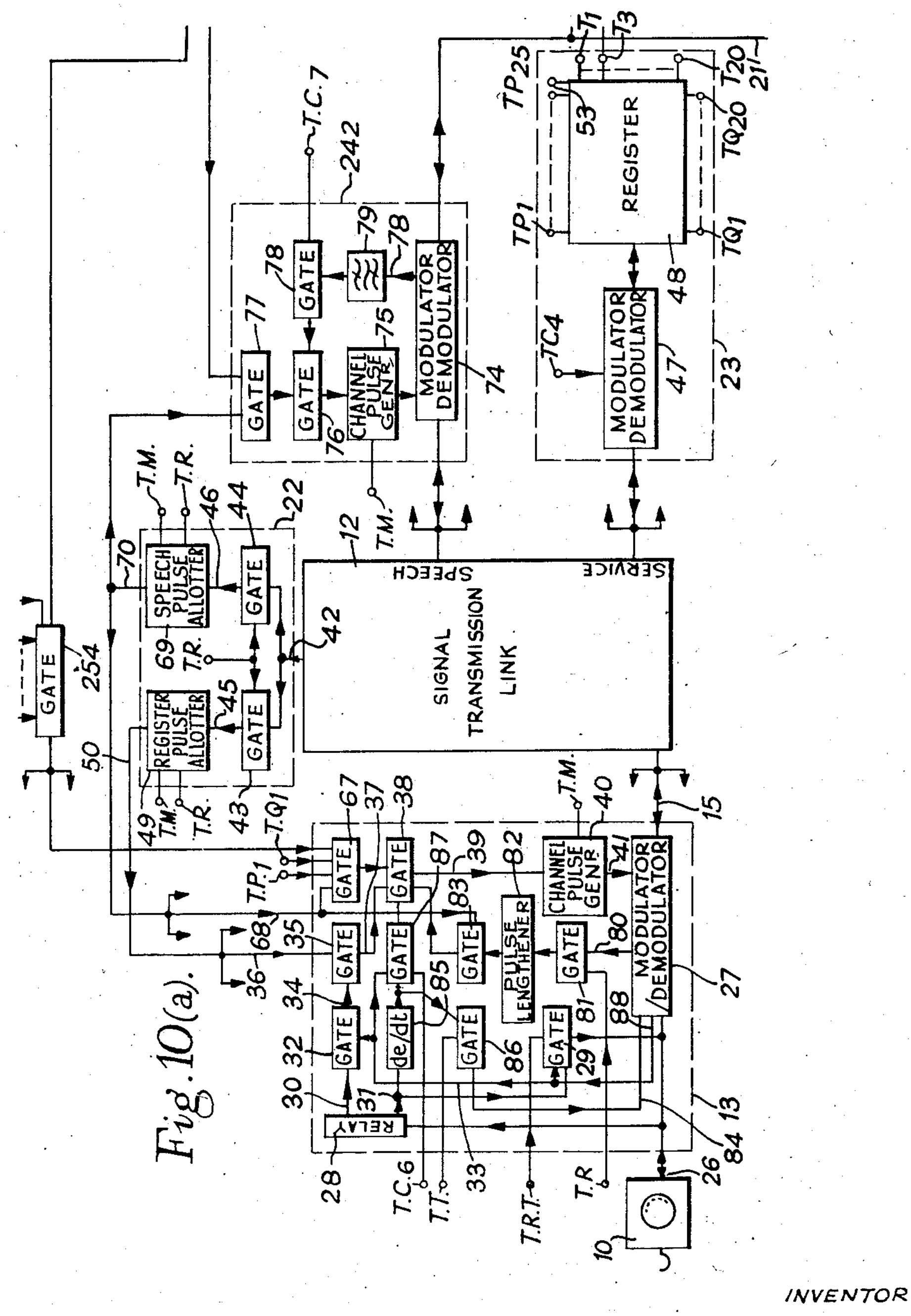
Figure 10B:
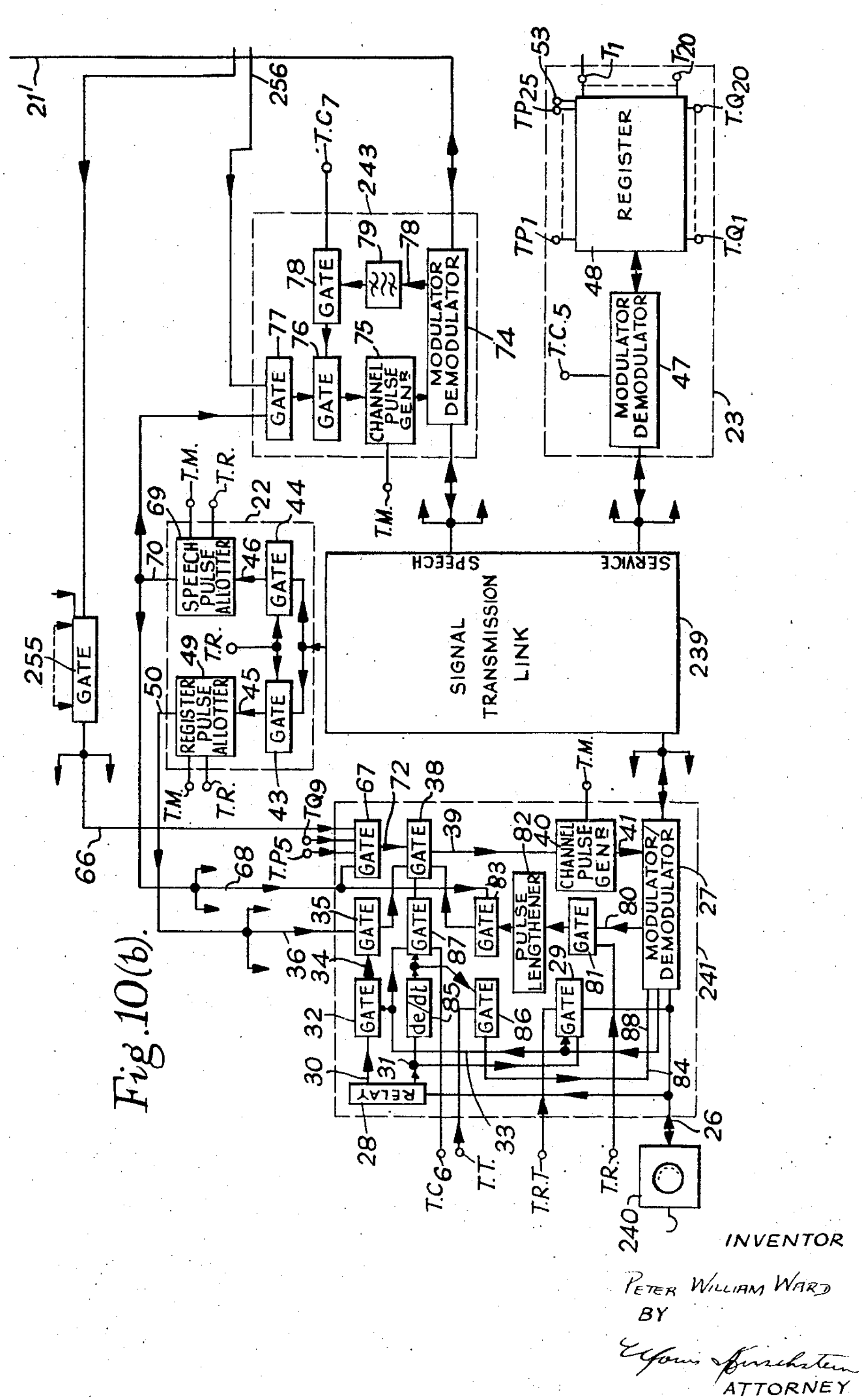
Figure 10C:
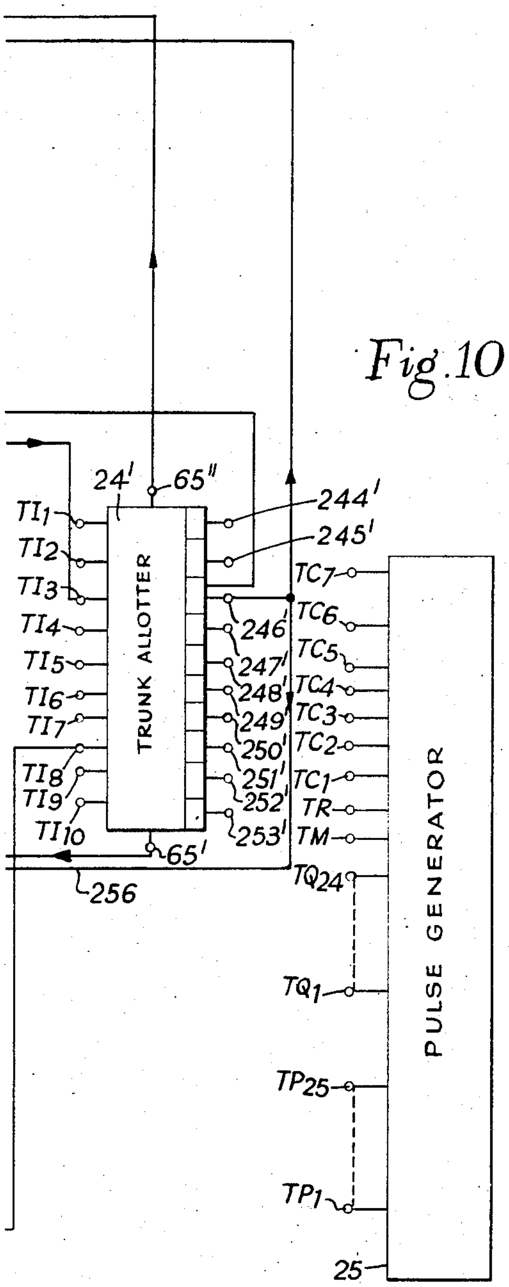
Figure 11:
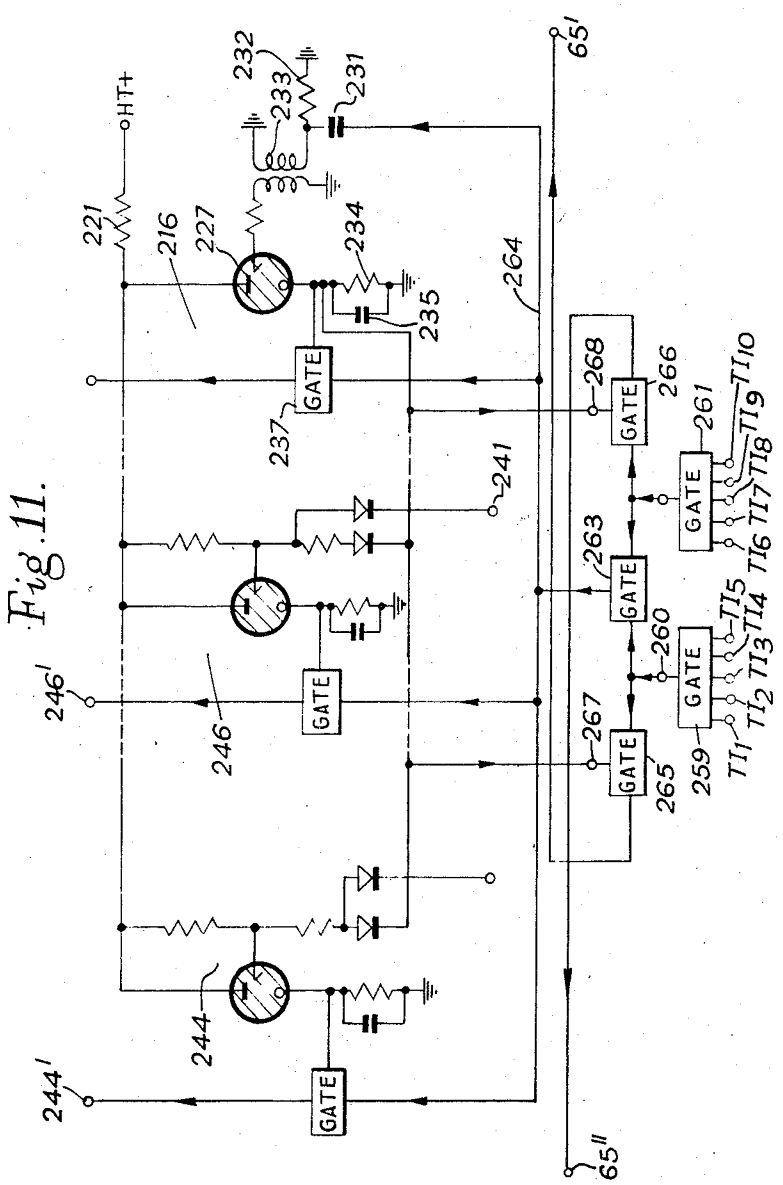
Figure 12:
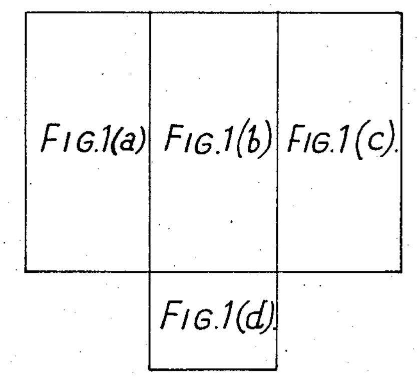
Figure 13:
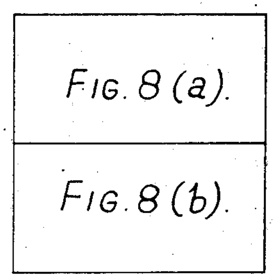
Figure 14:
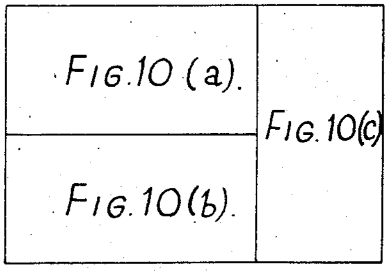

The invention will now be described by way of example with reference to the accompanying drawings in which Figure 1 is a block schematic diagram of an automatic telephone exchange comprising a single multiplex switching unit and is divided for convenience into Figs. 1(*a*), (*b*), (*c*), and (*d*) which are to be assembled as shown in Fig. 12, Figure 2 is an explanatory diagram showing the wave forms of voltages present in parts of the circuit of Figure 1, Figure 3 is a block schematic diagram of a pulse generator suitable for use in the arrangement of Figure 1, Figure 4 is an explanatory diagram, Figure 5 is a circuit diagram of a modulator and demodulator shown in block form in Figure 1, Figure 6 is a circuit diagram of part of a signal transmission link shown in block form in Figure 1, Figure 7 is a diagram showing in more detail control apparatus shown in block form in Figure 1, Figure 8 is a diagram showing in more detail further control apparatus shown in block form in Figure 1, and is divided for convenience into Figs. 8(*a*) and 8(*b*) which are to be assembled as shown in Fig. 13, Figure 9 is a diagram showing in more detail further control apparatus shown in block form in Figure 1, Figure 10 is a block schematic diagram of part of a second embodiment of the invention suitable for use as a 10,000 line exchange, and is divided for convenience into Figs. 10(*a*), (*b*), and (*c*) which are to be assembled as shown in Figure 14, and Figure 11 is a diagram showing in more detail control apparatus shown in block form in Figure 10.

In the automatic telephone exchange shown in Figure 1 it is assumed that there are 500 subscribers and that one multiplex switching unit is employed. The instruments of two of the 500 subscribers are shown schematically at 10 and 11. The multiplex switching unit provides 100 channels and is adapted to enable speech to be transmitted in both directions. For the purposes to be described later it is assumed that 20 of the 100 channels are used for service purposes, that is to say for use in controlling switching operations.

Each of the subscribers' lines terminates in a line terminating unit, the line terminating unit for the subscriber 10 being shown within a broken line 13 and the line terminating unit for the subscriber 11 being shown within a broken line 14. All the line terminating units have connections such as 15 and 16 connecting the line terminating units to a signal transmission link 12. These connections constitute one of the aforesaid first connecting means. At the other end of the link 12 two groups of trunk terminating units are provided. One of the trunk terminating units in one of the groups is shown at 17 and one of the trunk terminating units in the other of the two groups of trunk terminating units is shown at 18.

In the present embodiment it is thought that a reasonable grade of service will be provided by ten trunk terminating units in each group. The trunk terminating units are connected to the link 12 through connections such as 19 and 20 which constitute the aforesaid second connecting means. It will be seen that the trunk terminating unit 17 which is in one of the groups of trunk terminating units is connected by a connection 21 to the trunk terminating unit 18 in the other of the groups of trunk terminating units. The connection 21 provides facilities for the transmission of speech in both directions and will normally be a four wire trunk.

As will be described later, when a call is made for example from the subscriber 10 to the subscriber 11 a first free channel is allotted to the line terminating unit 14 of the called subscriber 11 and a free one of the trunk terminating units for example the unit 18. The line terminating unit 13 and the trunk terminating unit 17 are then allotted another free one of the channels whereby a speech path is completed between the subscribers 10 and 11 through the line terminating unit 13, the first free channel in the link 12, the trunk terminating unit 17, the line 21, the trunk terminating unit 18, the other free channel in the link 12 and finally through the connection 16 and the line terminating unit 14 to the other susbscriber 11.

Control apparatus for enabling these connections to be established is that shown within broken lines 22 and 23 and a trunk allotter 24.

The arrangement of Figure 1 will now be described in more detail. Although the invention is equally applicable to arrangements using frequency division multiplex switching units and arrangements using time division multiplex switching units in what follows reference will be made only to arrangements using time division multiplex switching units.

In Figure 1 in order to generate pulses suitable for carrying speech and control signals a pulse generator 25 is provided. At the terminal TM of the pulse generator 25 there appears a master oscillation of a frequency of 1 mc./s. and this oscillation is used as will be described later, for controlling pulse generators in the various line and trunk terminating units. The wave form of the oscillation appearing at the terminal TM is preferably of sinusoidal shape and it is transmitted to the various units in the exchange by way of a coaxial cable (not shown) and where used is converted into square wave form and has its phase appropriately adjusted. It will be appreciated that the lengths of the transmission paths from the terminal TM to the various parts of the exchange will vary and hence the phase of the wave at different points in the exchange will differ slightly. It is for this reason that steps have to be taken to adjust the phase of the oscillation at the various points at which it is used in the exchange. For the purpose of description however the oscillation at the terminal TM will be assumed to be of square wave form as shown at M in Figure 2(*a*) and that this square wave form is transmitted to the various parts of the exchange where it is required. During the 100$\mu$ second interval shown in Figure 2(*a*) there are, therefore 100 pulses each of a duration of 0.5 microsecond.

At the terminal TR of the pulse generator 25 of Fig. 1 there appears an oscillation having the wave form shown at R in Figure 2(*a*). The positive-going portions each have a duration of 20$\mu$ seconds and the negative-going portions each have a duration of 80$\mu$ seconds. As will be described later the primary function of the wave R is to enable the 100 channels of the multiplex switching unit to be divided into a group of 80 for providing speech channels which occur during the 80$\mu$ seconds negative-going part of the wave, and 20 for providing service channels, the pulses in the service channels occurring during the 20$\mu$ seconds positive-going part of the wave R. At the terminals $TC_1$ to $TC_5$ respectively there appear the first five M pulses occurring during each positive-going portion of the R wave form of Figure 2(*a*). The sixth M pulse during this interval appears at the terminal $TC_6$ and the seventh M pulse appears at the terminal $TC_7$.

At the 25 terminals $TP_1$ to $TP_{25}$ there appear a plurality of pulses respectively, the pulses being phase-displaced from one another and each having a duration of 100$\mu$ seconds. These pulses which will be referred to as pulses $P_1$ to $P_{25}$ have leading edges which coincide with the leading edges of the positive-going portions of the R wave form. At the terminals $TQ_1$ to $TQ_{24}$ there appear 24 pulses each of 100$\mu$ seconds duration, these pulses also being phase-displaced from one another. These pulses will be referred to as pulses $Q_1$ to $Q_{24}$ respectively.

Referring to Figure 2(*b*), this shows the wave form R of Figure 2(*a*) to a smaller time scale and below the R pulse are shown pulses $P_1$, $P_2$ and $P_3$. There is also shown the Q pulse $Q_1$.

Referring to Figure 2(*c*), this shows the P pulse $P_1$ and the Q pulse $Q_1$ and from Figure 2(*c*) it will be seen that the recurrence period of the P pulses is 2.5 milliseconds whereas the recurrence period of the Q pulses is 2.4 milliseconds. Thus the pulses in any pair of P and Q pulses coincide with one another only once in every 60 milliseconds and by combining the different pairs of P and Q pulses by means of gates a series of 600 pulses may be produced which are phase displaced relatively to one another and which have a recurrence period of 60 milliseconds. Of these 600 pulses only 500 are employed, these 500 being used for the purpose of identifying the 500 subscribers' line terminating units connected to the multiplex switching unit 12 as will be described later.

In order to avoid complication in the drawing the connections from the terminals of the generator 25 to the various parts of the arrangement shown in Figure 1 are omitted. Terminals having like references in Figure 1 are assumed to be connected to one another.

Thus it will be seen that the terminals $TP_1$ and $TQ_1$ on the pulse generator 25 are connected to the terminals of like reference on the subscribers' line terminating unit 13. Similarly terminals $TP_7$ and $TQ_{20}$ of the pulse generator 25 are connected to the terminals of like reference on the subscribers line terminating unit 14.

As already explained 500 subscribers' line terminating units are assumed to be connected to the multiplex switching unit 12. Of these 500 terminating units only two (13 and 14) are shown in the drawing. All subscribers' line terminating units are however identical and hence it will be necessary to describe only one.

In the drawing the subscriber's instrument 10 is connected to the line terminating unit 13 by way of a connection 26. This connection 26 passes into a circuit comprising a modulator and a demodulator, the demodulator constituting a receiver, to a relay 28, and to a gate 29. The relay shown as block 28 may be of any suitable form, which will be apparent to those skilled in the automatic telephony art, and provides an output voltage at 30 when the subscriber at 10 commences a call and provides an output voltage at 31 when the subscriber at 10 replaces his hand-set on its rest. The relay may take any suitable form and may for example comprise an electromagnetic device or gas discharge device such as a gas-filled triode The conection 30 passes to a gate 32 and a connection is also made from the modulator/demodulator to this gate 32 by way of a connection 33. The gate 32 is of the kind which permits voltage to pass from the connection 30 to the output connection 34 only when there is no voltage present on the input to the gate from the connection 33. This occurs when a call is being made from the instrument 10.

Thus when the subscriber at 10 removes his hand-set from its rest a pulse of voltage passes from the relay unit 28 through the gate 32 and the connection 34 to a further gate 35. This gate 35 has an input connection 36 and an output connection 37 and the gate is arranged to open when voltage is applied thereto from the connection 34 whereby voltage can then be transmitted from the connection 36 to the output connection 37. The output connection 37 passes to a further gate 38 which has an output terminal 39 connected to a pulse generator 40.

This pulse generator, as will be described later, produces pulses having a recurrence period of 100 microseconds and provides the pulses by means of which speech voltages and other signals can be transmitted from the instrument 10 to the link 12, and by means of which modulated pulses for the subscriber at 10 can be selected and demodulated, the pulses generated by the pulse generator 40 being applied by means of a connection 41 to the modulator/demodulator 27. The square wave form M of Figure 2(*a*) is applied to the pulse generator 40 from the pulse generator 25 through the terminal TM and hence it will be appreciated that the pulse generator 40 provides a frequency division ratio of 100:1. It is arranged, as will be described later, that the phase of the pulse generated by the generator 40 can be made any one of the 100 phases necessary to enable signals to be transmitted in any one of 100 channels, the phase of the generator 40 being determined by the phase of a control pulse fed from the gate 38 to the pulse generator 40.

In order to describe the operation of the parts of the line terminating unit 13 so far referred to reference will now be made to the control apparatus 22. It is arranged, as will be described later, that pulses in all free channels in the link 12 whether these channels are speech channels or service channels appear at the output terminal 42 and pass into two gates 43 and 44. The wave form R of Figure 2(*a*) is applied to these gates by way of the terminal TR and it is arranged that in response to the wave form R the gate 43 opens during positive-going portions of the wave form R and closes during the negative-going portions whereas the gate 44 opens during the negative-going portions and closes during the positive-going portions. It will be seen, therefore, that the only pulses to appear at the output terminal 45 of the gate 43 are free service pulses and the only pulses to appear at the output terminal 46 of the gate 44 are free speech channel pulses.

In the present arrangement it will be assumed that there are five control units 23. These control units 23 each comprise a modulator/demodulator 47 and a register 48 and it is arranged as will be described later that the service pulses representing free control units 23 appear at the terminal 45 at the output of the gate 43 in the control apparatus 22. Pulses representing the five sets of control apparatus 23 will be referred to hereinafter as register pulses.

The free register pulses appearing at the terminal 45 are applied to a device 49 which will be referred to hereinafter as a register pulse allotter. The register pulse allotter performs the function of providing at its output terminal 50 a single recurring free register pulse and this output pulse from the register pulse allotter is applied as indicated by the arrows 51 to all the subscribers' line terminating units.

It will be seen that the output terminal 50 is connected to the input connection 36 of the gate 35 in the subscribers' line terminating unit 13. Thus as the gate 35 is opened as previously described when the subscriber 10 lifts his hand-set from its rest the free register pulse passes from the connection 36 through the gate 35 to the gate 38. This gate 38 is a gate of the kind which merely enables outputs from a number of other gates (to be described later) to be applied by the connection 39 to the pulse generator 40. Thus the free register pulse passes through the gate 38 to the pulse generator 40 and causes this pulse generator 40 to generate pulses of the same phase as the free register pulse applied thereto. Pulses of like phase are applied via the terminal $TC_3$ to the modulator/demodulator 47 associated with the register 48 and hence in this example the pulses applied from the generator 40 to the modulator/demodulator 27 enable dialling impulses to be transmitted from the instrument 10 through the line terminating unit 13, the multiplex switching unit 12 and the modulator/demodulator 47 to the register 48 where these dialling pulses are stored.

As indicated by the terminals $TP_1$ to $TP_{25}$ and $TQ_1$ to $TQ_{20}$ on the register 48 pulses $P_1$ to $P_{25}$ and pulses $Q_1$ to $Q_{20}$ are applied thereto. As will be described later the register 48 functions in such a manner that in response to the dialling impulses stored therein it produces a pulse at the terminal 52 by combining an appropriate one of the P pulses with an appropriate one of the Q pulses. The pulse appearing on the terminal 52 is representative of the number of the called subscriber and is of an appropriate one of th 500 phases previously referred to. It will be seen from the drawing that terminals $TP_1$ and $TQ_1$ are connected to the subscriber's line terminating unit 13 and that terminals $TP_7$ and $TQ_{20}$ are connected to the subscribers line terminating unit 14. Thus the subscribers line terminating unit 13 is identified by the recurring pulse obtained by combining pulses $P_1$ and $Q_1$ and the subscribers line terminating unit 14 is identified by the pulse obtained by combining pulses $P_7$ and $Q_{20}$.

In the present example it is assumed that the line terminating unit 14 is that of the called subscriber and hence the pulse which appears at the terminal 52 is that obtained by combining in the register pulses $P_7$ and $Q_{20}$. This pulse passes from the terminal 52 into the trunk allotter 24. 100$\mu$ seconds later a similar pulse appears at the terminal 53 of the register and is applied to the trunk allotter. As will be described later the trunk allotter comprises ten gates 54 to 63 each of which has two output terminals, the two output terminals on each gate having the same reference as that used for the gate with the addition of subscripts 1 and 2 respectively. The arrangement of the trunk allotter is made such that at any instant only one of the ten gates can be open and different gates are connected to different connected pairs of trunk terminating units. One such connection is shown at 64.

In the example shown the terminal $58_1$ is connected to the trunk terminating unit 18 and the terminal $58_2$ is connected to the trunk terminating unit 17. The trunk allotter has a further output terminal 65 which is connected to all line terminating units by means of connections 66 and gate 66'. The first pulse to be applied to the alloter from the register, that is to say the pulse appearing at the terminal 52 of the register, passes from the trunk allotter to the terminal 65 and through the open gate 58 to the terminal $58_1$. The pulse appearing at the terminal 65 passes to all subscribers' line terminating units and in these units is applied to a gate 67. As will be seen in the drawing the terminals $TP_1$ and $TQ_1$ are connected to the gate 67 of the unit 13 and the terminals $TP_7$ and $TQ_{20}$ connected to the gate 67 of the subscriber's line terminating unit 14. The gate 67 has an input connection 68 from the control apparatus 22. As will be described later, free speech channel pulses appearing in the connection 68 pass through the gate 67 in a subscribers line terminating unit only when a pulse appearing on the connection 66 is one which has been produced by combining P and Q pulses identical with the P and Q pulses applied to the gate 67 of the line terminating unit.

In the present example it has been assumed that the unit 14 is that of the called subscriber and that the pulse appearing at the terminal 65 and hence in the connection 66 is a pulse obtained by combining the pulses $P_7$ and $Q_{20}$. Thus the gate 67 in unit 13 is not effected by the pulse appearing in the connection 66 whereas in response to this pulse the gate 67 in the circuit 14 is opened.

Before proceeding any further with the description of the effect of the gate 67 opening, reference will now be made to the unit 22 which provides the pulses in the connection 68. As previously explained the pulses R applied to the gate 44 from the terminal TR cause the gate 44 to open during the negative-going parts of the wave R whereby, of the pulses arriving at the input of the gate 44, only those representative of free speech channels appear at the output 46 of the gate 44. These pulses are applied to a device 69 which will be referred to as a speech pulse allotter. The speech pulse allotter is adapted to provide at its output 70 in response to the application to the allotter of free speech channel pulses at the input 46 a recurring puls in only one of the free speech channels. As indicated by the arrows 71 this recurring free speech pulse is applied to all line terminating units in the exchange.

As already explained the only gate 67 to open in response to the pulse appearing in the connection 66 is the gate 67 in the line terminating unit 14 of the called subscriber. This gate therefore permits the free speech channel pulse appearing at 68 to pass through the gate 67, a connection 72, the gate 38 and the connection 39 to the pulse generator 40 in the unit 14. Thus the phase of the pulses generated by the generator 40 is adjusted to the phase of the free speech channel pulses indicated by the free speech channel pulse applied to the generator 40 from the connection 39.

Coincident with the appearance of the 100$\mu$ secs. pulse at the terminal 65 the same pulse appears at the terminal $58_1$ and as will be seen this pulse is applied through a connection 73 to the trunk terminating unit 18. All trunk terminating units are identical and each comprises a modulator/demodulator 74, a pulse generator 75, three gates 76, 77 and 78 and a band-pass filter 79. The demodulator portion of the modulator/demodulator constitutes a receiver. It will be seen that the pulses appearing in the connection 73 are applied to the gate 77 and that the free speech channel pulses appearing at the output 70 of the speech pulse allotter 69 are also applied to the gate 77. The application of a pulse from the connection 73 to the gate 77 serves to open the gate 77 and hence to permit a free speech channel pulse to pass through the gate 77 to the gate 76. As the pulses appearing in the connections 73 and 66 are coincident the same free speech channel pulse will be applied from the terminal 70 to the gate 77 as is applied from the connection 68 to the gate 67 in the subscribers line terminating unit 14. Hence the same speech channel pulse will pass through the gate 77 in the trunk terminating unit 18 as passes through the gate 67 in the line terminating unit 14. The free speech channel pulse appearing at the outpost of the gate 77 and applied to the gate 76 passes through the gate 76 to the pulse generator 75. The pulse generator 75 is of the same type as the pulse generator 40 and hence is caused to produce speech channel pulses of the same phase as that produced by the pulse generator 40 in the line terminating unit 14. The output of the generator 40 in the line terminating unit 14 is applied to the modulator/demodulator 27 therein and the pulses generated by the generator 75 in the trunk terminating unit 18 are applied to the modulator/demodulator 74 therein whereby a speech path is established between the four wire trunk 21 and the connection 26 between the line terminating unit 14 and the subscribers instrument 11.

As soon as the pulses in this alloted channel appear in the multiplex switching unit 12 they are cancelled from the output terminal 42 as will be described later and hence no longer appear at the inputs to the two gates 43 and 44.

It will be remembered that during the next succeeding 100$\mu$ secs. interval the pulse which previously appeared at the terminal 52 appears at the terminal 53 and passes into the trunk allotter 24. As will be described later this pulse appears at the terminal $58_2$ and hence is transmitted to the gate 77 in the trunk terminating unit 17. The recurring pulse in a further free speech channel appearing at the output 70 of the speech pulse allotter 69 passes therefore through the gates 77 and 76 to the pulse generator 75 in the unit 17 and causes this pulse generator to generate speech channel pulses in this further speech channel. Simultaneously with the application of the pulse from the terminal 53 to the trunk allotter 54 the same pulse is sampled by the modulator portion of the modulator/demodulator 47 and transmitted through the link 12 to the subscribers line terminating units. This pulse is gated in the demodulator portion of the modulator/demodulator 27 of the line terminating unit 13 and gives rise to a narrow pulse at an output 80 of the modulator/demodulator 27. This pulse is applied to a gate 81 which is controlled by the R wave form applied at the terminal TR to be open during the positive-going portions of the R wave form. Thus the narrow pulse passes through the gate 81 to a pulse-lengthening device 82. The pulse-lengthening device 82 serves to extend the duration of this narrow pulse to 100$\mu$ secs. or alternatively to the end of the 100$\mu$ seconds interval occupied by the pulse and this widened pulse is applied to a further gate 83 and keeps this gate open for the 100$\mu$ seconds interval occupied by the pulse. It will be seen that the connection 68 which carries the free speech channel pulse appearing at the output of the speech pulse allotter 69 is also connected to the gate 83 and hence the same speech channel pulse that is applied to the gate 77 in the unit 17 whilst the gate 77 is open is also applied to the gate 83 when opened by the pulse from the pulse lengthening device 82. Thus this speech pulse passes through the gate 83 and the gate 38 to the pulse generator 40 in the unit 13 causing this generator to generate speech channel pulses of the same phase as those generated by the generator 75 in the trunk terminating unit 17.

Thus a speech path is established between the line terminating units 13 and 14. As soon as this speech path is established a D. C. signal appears at an output connection 84 of the modulator/demodulator 27 in the subscribers line terminating unit 14 and is applied to open the gate 29. A terminal TRT to which ringing current is applied from any suitable source (not shown) is connected to the gate 29 and hence as soon as the gate 29 is opened by the voltage appearing in the connection 84 ringing current is transmitted to the subscribers line 26 connected to the terminating unit 14.

It will be appreciated that as soon as the second channel is established the pulses in this second channel are also cancelled from the output at 42. Similarly once the phase of the pulses generated by the generator 40 in the line terminating unit 13 is shifted from that of the allotted register pulse to that of the second allotted speech channel pulses the equipment 23 becomes free for use by other calling subscribers and the register pulses associated with this unit 23 appear again at the output 42. As the trunk terminating units 17 and 18 are in use in providing the speech path between the two subscribers 10 and 11 it is arranged, as will be described later, that the gate 58 closes and another of the gates connected to a free pair of trunk terminating units is automatically opened.

The action of the circuit arrangement at the end of a call will now be described. Assuming the subscriber at 10 replaces his hand-set on its rest, as previously explained a voltage appears on the line 31 at the output of the relay 28. This voltage is applied to a pulse-forming circuit 85 which may conveniently be in the form of a capacitor in a series with a resistor the output being taken from across the resistor. It is arranged that this circuit has a long time constant whereby the output of the pulse-forming circuit is in the form of a fairly wide pulse. The width may conveniently be 100 milliseconds. This pulse is applied to a gate 86 and to a further gate 87 and serves to open gate 86 for the 100 milliseconds duration of the pulse, while gate 87 remains closed owing to the presence of a signal on lead 84. The gate 86 has an audio-frequency oscillation applied thereto from the terminal TT and hence when the gate 86 is opened by the pulse from the circuit 85 this audio-frequency oscillation passes through the gate 86 and connection 88 to the modulator/demodulator 27 in the terminating unit 13. Thus this tone is transmitted through the link 12 to the modulator/demodulator 17 which has an output connected through connection 89 to the band-pass filter 79. The pass-band of the band-pass filter 79 is such as to include the audio-frequency transmitted thereto from the terminal TT of the unit 13 and this oscillation passing through the filter 79 serves to open the gate 78. Pulses in channel No. 7 applied to the terminal $TC_7$ of the gate 78 pass therefore through the gate 76 to the pulse generator 75 and cause this generator to change its phase to that of channel No. 7. Channel No. 7 is an idle channel, that is to say a channel which is used neither for speech nor register purposes.

The consequent removal of the signal from lead 84 allows the pulse at the output of the pulse forming circuit 85 to open the gate 87 allowing pulses in channel No. 6 applied to the terminal $TC_6$ of the unit 13 to pass through the gate 38 to the pulse generator 40. Thus the pulse generator 40 is caused to shift its phase to that of channel No. 6 and this channel like channel No. 7 is an idle channel. The action on the other subscriber at 11 replacing his hand-set on its rest is precisely the same with respect to the units 14 and 18 whereby the pulse generator 40 of the unit 14 has its phase shifted to that of channel No. 6 and the pulse generator 75 of the unit 18 has its phase shifted to that of channel No. 7.

As will be described later it is preferred to arrange that the pulse generators run on idle channels when not required for use rather than to be quiescent.

Referring now to the construction of the various parts shown in block form in Figure 1, the construction of the various gate circuits will be understood by those skilled in the art. Reference may be made however to section 4–3–4 of "High Speed Computing Devices" by the Staff of Engineering Research Associates Inc., published by McGraw-Hill Book Company in 1950, volume 19 (Wave forms) of the Massachusetts Institute of Technology Radiation Laboratories Series, sections 10–2, 10–3 and 10–6 to 10–11 also published by the McGraw-Hill Book Company, and an article by E. A. R. Peddle in the "Wireless World", November 2, 1952 published by Iliffe & Sons Limited, the article being entitled "Electronic switching parts I and II."

The pulse generators 40 and 75 may be as described in United States patent application Serial No. 395,486 or United States patent application Serial No. 404,354. A brief description will now be given of the generator described in United States patent application Serial No. 395,486 with reference to Figures 3 and 4 of the accompanying drawings.

Figure 3 is a block schematic diagram of the pulse generator and the input terminal TM is shown connected to a blocking oscillator 90 which functions as a frequency divider having a frequency division ratio of 10:1. The output of this frequency divider is applied to the input of a second frequency divider 91 also providing a frequency division ratio of 10:1. The output of the second frequency divider 91 appears at 41. The connection 39, which will be seen in Figure 1 comes from the gate 38, passes to both frequency dividers 90 and 91. It will be remembered that the input at the terminal TM is in the form of a square wave having a frequency of 1 mc./s. Thus as the two frequency dividers are connected in cascade they provide an overall division ratio of 100:1. The pulses appearing at the output 41 have, therefore, a recurrence frequency of 10,000 P. P. S.

Referring now to Figure 4(*a*) this illustrates the voltages present at the control grid of the valve in the blocking oscillator 90. The level 92 is the voltage level at which the blocking oscillator triggers and commences a new cycle. When triggering occurs the grid voltage falls rapidly to the level 93 as illustrated by the curve 94. Between the instant $t_1$ at which triggering occurs and $t_2$ at which the next triggering occurs the grid voltage rises exponentially as shown by the curve 95, towards the level 92 at which triggering again occurs. The 1 mc./s. pulses applied at the terminal TM in Figure 1 are shown at 96 superimposed on the curve 95 and it will be seen that between the instants $t_1$ and $t_2$ ten of these pulses occur and the tenth shown at 97 causes the grid voltage to rise above the triggering level 92 whereby the oscillator is then caused to commence a new cycle.

Referring now to Figure 4(*b*) this illustrates the manner in which a pulse appearing in the connection 39 causes the phase of the pulse generated by the generator to be shifted to a desired value. Following the instant $t_3$ in Figure 4(*b*) only two pulses 96 occur before the arrival of a pulse 98 of large amplitude in the connection 39. It is arranged in Figure 1 that all pulses fed to the pulse generator 40 from the line 39 and similarly all pulses fed to the pulse generator 75 and the gate 76 have an amplitude which is greater than the maximum excursion of the grid voltage in the blocking oscillators. This pulse 98 as shown in Figure 4(*b*) always carries the grid voltage above the level 92 irrespective of the instant at which the pulse 98 is applied. As the pulse 98 carries the grid voltage over the triggering level 92 the oscillator is triggered and commences a new cycle as shown in Figure 4(*b*) at the instant $t_4$ whereby the output pulses 97 from the oscillator are shifted in phase. The pulses applied to the blocking oscillator 90 are also applied to the oscillator 91 and hence it will be understood that the output at the connection 41 is caused to assume a phase corresponding to that of the pulse applied in the connection 39.

Each of the modulator/demodulators 27, 74 and 47 may be as shown in Figure 5 of the accompanying drawings. In Figure 5 connections 26, 41 and 15 correspond to the connections of like reference in Figure 1. It will be seen that the connection 26 from the subscriber 10 is connected in Figure 5 through one side of a hybrid transformer 99 to an output terminal 100 and through the other side of the transformer to a low pass filter 101. The remainder of the circuit of Figure 5 will be understood from a paper entitled "Electronic telephone exchanges" by T. H. Flowers published in the Proceedings of the Institution of Electrical Engineers, part 1, volume 99, No. 119, September 1952, Figure 6 and its accompanying description.

In Figure 5 the components 270 to 282 constitute a receiver in the form of a pulse demodulator adapted to demodulate pulses applied to the rectifier 270 and coincident with pulses applied to the connection 41. The components 283 to 291 constitute a pulse modulator enabling pulses applied at 41 to be amplitude-modulated by speech voltages from the transformer secondary winding 291. If four-wire trunks are employed for connecting trunk terminating units together the hybrid transformer 99 is, of course, omitted whereby the output of the filter 101 each trunk terminating unit is connected direct to 291 in the trunk terminating unit paired therewith.

Referring now to Figure 6 this is a circuit diagram showing a part of the link 12 of Figure 1. Connections 15 and 19 of Figure 6 correspond to the connections of like reference in Figure 1. The outputs of the modulator/demodulators 27 in the 500 subscribers' line terminating units are connected together in groups by means of rectifiers such as 102 in Figure 6. The rectifiers in the several groups are connected to the grids of triode valves associated with the groups respectively, one such triode valve being shown at 103. These triode valves are provided with cathode load resistors 104 and the outputs of the several triodes are combined through further rectifiers 105 at the control grid of a pentode valve 106. The output of this valve appearing at the anode thereof is applied to an amplifier 107 having a D.-C. restoring diode 108 connected in this control grid circuit. The amplifier valve 107 functions as a cathode follower and has a cathode load resistor 108'. The voltage appearing at the cathode of the valve 107 is applied to the control grid of a further pentode amplifier 109 through a pulse shaping circuit comprising two rectifiers 110 and 111 and a resistor 112. The 1 mc./s. square wave M of Figure 2(*a*) is applied to the rectifier 111 from the terminal TM and this pulse shaping circuit functions as described in United States Patent No. 2,685,646 to provide pulses of substantially rectangular waveform. The output of the valve 109 appearing at the anode thereof is applied to the control grid of a further triode 113 and to a gate 114. A. D.-C. restoring diode 115 is also connected in the control grid circuit of the triode 113. The triode 113 has a cathode load resistor 116 and functions as a cathode follower.

The output appearing at the cathode of the valve 116 is applied to a control grid of a number of triodes of which one is shown at 117. The triodes 117 have cathode load resistors 118 and function as cathode follower valves, and different groups of trunk terminating units are connected to the cathodes of different output triodes 117.

The pulses appearing at the input to the gate 114 are gated by means of the square wave form M applied at the terminal TM. It is arranged that the gate normally allows the pulses in the square wave M to pass through the gate 114 except when a pulse is present at the input from the grid of the valve 113. Thus, as these pulses applied to the input of the gate from the valve 113 are pulses of engaged channels, the output in the connector 42 is in the form of pulses in free channels whether these channels be speech channels or service channels.

The arrangement of Figure 6 is suitable for transmitting pulses from the left to the right of the multiplex switching unit in the drawing. An arrangement as shown in Figure 6 is used for conveying pulses from the right to the left of the multiplex switching unit in the drawing. The second arrangement is not, of course, provided with the gate 114 and output 42.

The register pulse allotter 49 and the speech pulse allotter 69 will now be described with reference to Figure 7. It will be remembered that the pulses appearing in the connection 42 of Figure 1 and shown in Figure 7 are the pulses in the free speech and service channels in the link 12. These pulses are applied to the gate 43 to which the R wave form is also applied from the terminal TR. The gate 43 is arranged to be such that it opens during the negative-going portions of the wave form R. Thus the only free pulses to pass from the connection 42 to the output of the gate 43 are free speech pulses and these are applied to the speech pulse allotter 69. The speech pulse allotter 69 comprises a bi-stable multi-vibrator 119 and a "one-shot" blocking oscillator 120. The multi-vibrator 119 is caused to pass from one of its stable states to the other of its stable states on the application thereto of a free speech channel pulse from the gate 43 and as this occurs an output pulse appears in a connection 121 and passes therethrough to the blocking oscillator 120. The blocking oscillator is triggered by this pulse and produces a pulse of the same phase but greatly increased amplitude at the terminal 50 in response thereto. This is the pulse of large amplitude which is fed to the several subscribers' line terminating units. The blocking oscillator 120 remains quiescent thereafter until triggered again and the multi-vibrator 119 remains in its second stable state until reset by a resetting pulse appearing in the connection 122. This resetting pulse is derived from the leading edge of the R pulse applied to the terminal TR by means of a differentiating circuit 123 connected between the terminal TR and the connection 122. Thus the speech pulse allotter 69 remains unresponsive to any further free speech channel pulses applied thereto until the next 100$\mu$ secs. interval occurring after the multi-vibrator 119 has been reset.

The gate 44 in Figure 7 is shown to comprise a pulse former 124 to which the R pulses are applied. The pulse former may be as described in Radar Engineering by D. G. Fink published by the McGraw-Hill Book Company, Inc., 1947, section 128 commencing on page 325. The pulse former 124 is adapted to produce from the R pulses further pulses which have a duration just sufficient to include the five register channel pulses and to exclude all other pulses. Thus the only pulses to pass through the gate 44 are free register pulses. The register pulse allotter 49 comprises a bi-stable multi-vibrator 125 and a "one-shot" blocking oscillator 126 which are arranged in exactly the same way as the multi-vibrator 119 and the blocking oscillator 120 in the speech pulse allotter 69. It will be appreciated therefore that on the application of a free register pulse to the multi-vibrator 125 a pulse is applied from the multi-vibrator 125 to the blocking oscillator 126 and causes a pulse in the same phase but of considerably increased amplitude to appear at the output 70.

In a possible modification of the arrangement of Figure 7 the gate 43 may be dispensed with by arranging that the differentiating circuit 123 supplies a resetting pulse coincident with the trailing edge of the R pulses instead of the leading edge thereof. The thirteen space service pulses may then be employed as busy pulses whereby should all the speech channel pulses be engaged the next pulse to occur is one of the thirteen space pulses which can be applied to transmit a busy tone to the calling subscriber.

Referring now to Figure 8, this is a block schematic diagram of a suitable form of register for use at 48 in Figure 1. The register shown in Figure 8 has an input terminal 127 to which the output of the demodulator section of the modulator/demodulator 47 of Figure 1 is applied. Thus during dialling the dialling impulses appear in the connection 128 and are applied to the inputs of four gates 129, 130, 131 and 132 which are normally closed. In addition the impulses appearing in the connection 128 are applied to the input of a monostable multi-vibrator 133. This multi-vibrator is arranged to be triggered and to return to its normal condition after an interval of more than 100 m. secs. and less than 400 m. secs. after the application of a pulse thereto from the connection 128. A suitable form of multi-vibrator for use at 133 comprises an input terminal connected to the cathode of a first rectifier whose anode is connected to the control grid of a first triode and to the cathode of a second rectifier whose anode is connected to the negative terminal of a source of bias voltage. The control grid of the first triode is connected through a resistor and capacitor in parallel to the anode of a second triode. The anode of the first triode is connected to the control grid of the second triode through a capacitor.

Thus the first triode is conducting when the multi-vibrator is in its stable state and the operating pulses are arranged to be negative-going. On the application to the multi-vibrator of a succession of dialling impulses of standard repetition frequency (10 P. P. S.) and representative of one digit the circuit does not revert to its stable state until after the last pulse in the succession.

When the multi-vibrator 133 reverts to its stable state it provides an output pulse which is applied to a differentiating circuit 134. This differentiating circuit 134 derives a further pulse from the pulse applied thereto and this derived pulse is applied to a counter device 135. This device 135 comprises five units marked M, C, D, U and Z respectively which may be of known form and which are arranged in such a manner that on the application of the aforementioned derived pulses to the input of the counter device become operated in turn by the pulses respectively, the unit M being in the operated condition initially.

The arrangement of Figure 8 is suitable not only for use with the arrangement of Figure 1 which provides facilities for 500 subscribers but also for a further embodiment to be described later which provides facilities for 10,000 subscribers. Thus although in the arrangement of Figure 1 it is necessary fundamentally to dial only three digits it will be assumed that four digits are dialled of which the first is "0", the other three digits being representative of the hundreds, tens and units in the number of the called subscriber.

The outputs of the units M, C, D and U of the device 135 are applied to control the gates 129 to 132 respectively. Thus when the impulses representing the first digit dialled are received in the connection 128 the unit M in device 135 is already operated and the gate 129 is open and permits the impulses representing the first digit to pass therethrough. The output of the gate 129 is applied to a further counter device 136 comprising ten units marked 1 to 9 and 0 respectively. This counter device functions in known manner and in response to the application thereto of a succession of pulses is left with that one of the units therein operated whose number corresponds with the number of impulses applied to the device. In the present embodiment of the invention this number of pulses will always be ten which corresponds to the digit "0" and hence the unit marked "0" will remain operated. When a unit is operated it provides a D. C. output voltage. Subsequently the multi-vibrator 133 reverts to its stable state and device 135 steps to unit C.

On the application of the next group of pulses which represent the next digit dialled the multi-vibrator 133 will again be triggered and as the gate 130 is now open, the gate 129 being closed on the return of the unit M to its unoperated condition, the next group of impulses appearing in the connection 128 pass through the gate 130. The output of this gate is applied to a further counter device 137 which may be identical with the counter device 136. Thus the impulses representing the second digit dialled are stored in the device 137.

The impulses representing the next two digits dialled are stored in like manner in device 138 and 139 which may be identical with the device 136.

The unit Z becomes operated in the device 135 when the multi-vibrator 133 reverts to its stable state after the fourth digit has been dialled.

The counter devices 135, 136, 137, 138 and 139 may be in the form of a digital train counter as described on page 467 of Wireless World November 1952 published by Iliffe & Sons Ltd., London.

The arrangement to the right of the devices 136 to 139 in the drawing functions to convert the output from the devices 136 to 139 into the pulse which appears at one of 20 output terminals $T_1$ to $T_{20}$ and has an instant of occurrence representative of the number of the called subscriber.

It will be seen that ten gates 140 to 149 are associated with the counter device 139 the outputs of the units 1 to 9 and 0 of the device 139 being applied to these ten gates respectively. The ten gates have different pairs of the Q pulses applied thereto as will be evident from the terminals connected to the gates. For example as terminals $TQ_1$ and $TQ_{11}$ are connected to the gate 140 pulses $Q_1$ and $Q_{11}$ are applied thereto. Thus when a gate of the group 140 to 149 is opened by the application thereto of a control voltage from the device 139 the two Q pulses applied to such gate pass therethrough. The outputs of the gates 140 to 149 are applied through a common connection to the input of a further gate 150 which is controlled by the output from the Z unit in the device 135.

The output of the gate 150 is applied to the inputs of two further gates 151 and 152 and as will be seen from the references of the terminals connected to these two gates, Q-pulses $Q_1$ to $Q_{10}$ are applied to the gate 151 and Q pulses $Q_{11}$ to $Q_{20}$ are applied to the gate 152.

The output of the gate 151 is applied to the inputs of five gates 153 to 157 respectively and the output of the gate 152 is applied to the inputs of five gates 158 to 162 respectively. Pulses $P_1$, $P_6$, $P_{11}$, $P_{16}$ and $P_{21}$ are applied through a combining gate 163 to the inputs of the two gates 153 and 158, pulses $P_2$, $P_7$, $P_{12}$, $P_{17}$ and $P_{22}$ are applied through a combining gate 164 to the inputs of the two gates 154 and 159, pulses $P_3$, $P_8$, $P_{13}$, $P_{18}$ and $P_{23}$ are applied through a combining gate 165 to the inputs of the two gates 155 and 160, pulses $P_4$, $P_9$, $P_{14}$, $P_{19}$ and $P_{24}$ are applied through a combining gate 166 to the inputs of the two gates 156 and 161, and pulses $P_5$, $P_{10}$, $P_{15}$, $P_{20}$ and $P_{25}$ are applied through a combining gate 167 to the inputs of the two gates 157 and 162.

The output voltages of the odd numbered units in the counter device 138 control the gates 153 to 157 respectively and the output voltages of the even numbered units in the counter device 138 control the gates 158 to 162 respectively.

The outputs of the gates 153 to 162 are applied through a common connection 168 to the inputs of five gates 169 to 173. Pulses $P_1$ to $P_5$ are fed to the gate 169 through a combining gate 174, pulses $P_6$ to $P_{10}$ are applied through a combining gate 175 to the gate 170, pulses $P_{11}$ to $P_{15}$ are fed through a combining gate 176 to the gate 171, pulses $P_{16}$ to $P_{20}$ are fed through a combining gate 177 to the gate 172, and pulses $P_{21}$ to $P_{25}$ are fed through a combining gate 178 to the gate 173.

The outputs of the ten units in the device 137 are applied as control voltages to ten gates 179 to 188 in the manner shown. The output of the gate 169 is applied to the gates 179 and 180, the output of the gate 170 is applied to the gates 181 and 182, the output of the gate 171 is applied to the gates 183 and 184, the output of the gate 172 is applied to the gates 185 and 186 and the output of the gate 173 is applied to the gates 187 and 188.

The outputs of the gates 179, 181, 183, 185 and 187 are applied through a common connection 189 to gates 190 to 199 and the outputs of the gates 180, 182, 184, 186 and 188 are applied through a common connection 200 to gates 201 to 210. The voltages provided by the ten units in the device 136 are applied as control voltages to the gates 190 to 199 respectively and to the gates 201 to 210 respectively. The outputs to the gates 190 to 199 and 201 to 210 are connected as shown to the output terminals $T_1$ to $T_{20}$. The output terminal $T_1$ is connected to a further terminal 52 which corresponds with the terminal of the same reference in Figure 1.

The common connection 189 also passes to gates 211 and 212. The output of the unit "0" in the device 136 is applied to a gate 211 from a terminal 213 and the output of the gate 211 is applied through a delay circuit 214 to the gate 212. A connection is also made direct from the output of the gate 211 to the gate 212 and the output of the delay circuit 214 is also applied direct to the terminal 53 which corresponds to the terminal 53 in Figure 1.

In order to illustrate the action of the arrangement to the right of the devices 136 to 139 in Figure 8 it will be assumed that the number 0234 is dialled by the calling subscriber. The units marked 0, 2, 3 and 4 in the devices 136 to 139 respectively become operated when this number is dialled. Thus gates 199, 180, 154 and 143 are opened. Gate 150 is operated by the unit Z of the device 135. Thus pulses $Q_4$ and $Q_{14}$ applied to the gate 143 are transmitted through the gate 150 to the gates 151 and 152. As pulses $Q_1$ to $Q_{10}$ are applied to the gate 151 the $Q_4$ pulse applied to the gate 151 permits the $Q_4$ pulse applied thereto from the terminal $TQ_4$ thereof to pass to the gates 153 to 157. Similarly the gate 152 passes the $Q_{14}$ pulse to the gates 158 to 162. The only one of the gates 158 to 162 which is open is 154. The output of the gate 154 consists of those of the pulses $P_2$, $P_7$, $P_{12}$, $P_{17}$ and $P_{22}$ which coincide with the $Q_4$ pulses applied to the gate 154. The output of the gate 154 in this form passes to the common input of the gates 169 to 173. The only pulses to pass through these gates are the P pulses applied thereto from the terminals $TP_1$ to $TP_{25}$ which coincide with the gate pulses applied from the common input connection 168. Thus the $P_2$ pulses coinciding with the $Q_4$ pulses pass through the gate 169, the $P_7$ pulses coinciding with the $Q_4$ pulses pass through the gate 170, the $P_{12}$ pulses coinciding with the $Q_4$ pulses pass through the gate 171, the $P_{17}$ pulses coinciding with the $Q_4$ pulses pass through the gate 172 and the $P_{22}$ pulses coinciding with the $Q_4$ pulses pass through the gate 173.

Of the gates 179 to 188 only 183 is open, this gate being controlled by the unit marked 2 in the device 137. The $P_{12}$ pulses coinciding with the $Q_4$ pulses pass therefore through the gate 183 to the common connection 189. No pulses pass to the common connection 200. The pulses appearing in the common connection 189 are applied to the input of the gates 190 to 199. Of these gates only 199 is open and hence there appears at the terminal $T_1$ connected to the terminal 52 the $P_{12}$ pulses which coincide with the $Q_4$ pulses. It is arranged that these pulses correspond to the subscriber having the number 234.

The operation of the parts when any other digit between 1 and 500 and prefaced by the digit "0" is dialled will be apparent from the foregoing description.

Referring now to the pulses appearing at the terminal 53 as the gate 211 is open the pulses appearing in the connection 189 pass to the delay circuit 214 and to the gate 212. The pulses applied to the gate 212 function as inhibiting pulses for the gate 212 which normally functions to permit pulses appearing in the common connections 200 and 189 to pass to an output terminal 215. The pulses applied to the delay circuit 214 are delayed by 100$\mu$ seconds by the delay circuit and hence appear at the terminal 53 100$\mu$ secs. after the pulses appearing at the terminal 52.

Referring now to Figure 9 this is a circuit diagram of a part of a suitable trunk allotter for use at 24 in Figure 1. The arrangement of Figure 9 comprises ten gates of which two are shown at 54 and 58, a gate 216, and three further gates 217 to 219. Each of the first mentioned ten gates in the arrangement of Figure 9 comprises a gas-filled discharge valve 220 whose anode is connected through a common anode load resistor 221 to the positive terminal HT+ of a source of anode current whose negative terminal is earthed. The cathode lead of the valve 220 includes a resistor 222 and a capacitor 223 connected in parallel and the control electrode of the valve is connected to the terminal HT+ through a resistor 224 and the resistor 221. The control electrode of the valve 220 is also connected through a resistor 225 and a rectifier 226 in series to the cathode of a gas-filled discharge valve 227 in the gate 216. The junction of the resistor 225 and the rectifier 226 is connected through a further rectifier 228 to the terminal 64 which corresponds to the connection of the same reference in Figure 1. The cathode of the valve 220 is connected to control two gates 229 and 230 whose outputs are connected to the two terminals $58_1$ and $58_2$ respectively which correspond to the terminals of the same reference in Figure 1. The input of the gate 229 is in the form of pulses which appear at the output of the gate 218 and the terminals 52 of the five registers assumed to be employed are connected to the combining gate 218. The input to the gate 230 is in the form of pulses which appear at the output of the gate 217 and the terminals 53 of the five registers are connected to the gate 217. The output of the gate 218 also passes through the gate 219 to the output terminal 65 which corresponds to the terminal of the same reference in Figure 1.

In addition the output of the gate 217 is applied through a differentiating circuit 231, 232 and a transformer 233 to the control electrode of the valve 227 in the gate 216. The cathode lead of the valve 227 includes a resistor 234 and a capacitor 235 connected in parallel.

In operation only one of the ten gates such as 58 is open. When such a gate is open the valve therein is struck whereby the capacitor 223 is charged with its upper plate in the drawing positive. This causes the gates 229 and 230 associated therewith to open and hence the next two pulses applied to the gates 229 and 230 respectively pass therethrough to the output terminals $58_1$ and $58_2$ respectively. The trailing edge of the pulse appearing in the output of the gate 217 is differentiated by the differentiating circuit 231, 232 and the transformer 233 applies the resulting narrow pulse in a positive-going sense to the control electrode of the valve 227 causing this valve to strike. The anode current flowing in this valve causes sufficient voltage drop across the resistor 221 to ensure that all other valves are extinguished. At the same time the capacitor 235 in the cathode circuit of the valve 227 becomes charged with its upper plate in the drawing positive. As the upper plate of the capacitor 235 is connected through a connection 236 to the rectifiers 226 in the gates such as 58 the potential of the control electrodes of the gas-filled valves in these gates tend to rise positively. The junction of the resistor 225 and rectifier 226 is connected further through the rectifier 228 to the terminal 64 and it is arranged that when a trunk between two of the trunk terminating units is engaged the potential of the terminals associated therewith such as terminal 64 is negative. Thus the control electrodes of those of the valves which are connected to engaged trunks are prevented from becoming positive and these valves cannot strike. The only valves which can strike are those which are connected to free trunks and because of unavoidable difference in striking times one of these valves will strike before any other. The anode current flowing in this struck valve will cause sufficient voltage drop across the resistor 221 to prevent any other valve from striking and to extinguish the valve 227 whereby the circuit is ready to receive the next pair of pulses appearing at the outputs of the two gates 217 and 218 respectively.

In the event of all gates such as 58 being engaged the valve 227 does not become extinguished and hence the cathode potential therefore remains positive. This causes the gate 237 connected to the cathode of the valve 227 to remain open whereby the next pulse to appear in the output of the gate 217 passes to an output terminal 238. This pulse may be used to cause a busy tone to be applied to the calling subscriber's line.

For example, one additional trunk terminating unit may be provided and the pulse generator therein arranged normally to generate pulses in an idle channel. A source of busy tone may be connected permanently to the modulator and the pulse appearing at the terminal 138 applied to shift the phase of the pulse generator in the extra trunk terminating unit and the calling subscriber's line terminating unit to that of a free channel whereby the busy tone is transmitted to the calling subscriber.

Referring now to Figure 10 this is a block schematic diagram of a part of an exchange suitable for use with 10,000 subscribers. The 10,000 subscribers line terminating units are connected in groups of 500 to 20 different multiplex switching units of which only two are shown at 12 and 239. The switching unit 12 corresponds to that shown in Figure 1 and has the subscriber's instrument 10 connected thereto. One other subscriber's instrument 240 is shown connected through a line terminating unit 241 to the multiplex switching unit 239.

All the line terminating units and all 20 of the multiplex switching units are identical to those shown in Figure 1. Similarly the control apparatus 22 and 23 is the same for all multiplex switching units.

In order to enable a subscriber associated with any multiplex switching unit to communicate with a subscriber associated with any other multiplex switching unit each multiplex switching unit is provided with 19 groups of trunk terminating units in addition to the two groups of trunk terminating units already described. There may conveniently be ten trunk terminating units in each of these further groups of trunk terminating units. Each group of trunk terminating units has ten four-wire trunks extending from the ten trunk terminating units respectively therein to the trunk terminating units in a corresponding group of trunk terminating units associated with another of the multiplex switching units, the trunks from different groups extending to groups of trunk terminating units associated with different multiplex switching units respectively.

In the drawing one such trunk is shown at 21' extending between a trunk terminating unit 242 associated with the multiplex switching unit 12 and a trunk terminating unit 243 associated with the multiplex switching unit 239. These further trunk terminating units are identical with the trunk terminating units already described with reference to Figure 1.

For each group of these additional trunks there is provided an additional trunk allotter and these additional trunk allotters differ from those shown in Figure 1.

As will be seen from Figure 10 the trunk allotter 24' which controls allocation of trunk terminating units and trunks between the multiplex switching unit 12 and the multiplex switching unit 239 has ten input terminals $TI_1$ to $TI_{10}$. Assuming the multiplex switching unit 239 to be multiplex switching unit No. 3 the terminals $T_3$ of the registers 48 associated with the multiplex switching unit 12 are connected to the input terminals $TI_1$ to $TI_5$ respectively of the trunk allotter 24'. If the multiplex switching unit 12 is assumed to be No. 1 then the terminals $T_1$ of the registers associated with the multiplex switching unit 239 are connected to the terminals $TI_6$ to $TI_{10}$ respectively of the trunk allotter 24'.

The trunk allotter 24' is provided with ten gates 244 to 253 and these gates have output terminals 244' to 253' respectively. These gates are controlled as in the arrangement of Figure 1 by the voltages appearing in the four-wire trunks associated therewith respectively. Two further output terminals are provided on the trunk allotter 24' at 65' and 65''. These two output terminals are connected through gates 254 and 255 to the subscribers line terminating units associated with the multiplex switching units 12 and 239 respectively.

Before describing in detail the trunk allotter 24' and some modifications necessary to the registers the action of the arrangement of Figure 10 will be described.

Assuming the subscriber 10 connected to the multiplex switching unit 12 to be calling the subscriber 240 connected to the multiplex switching unit 239 the first operation is the allottment of a free register to the calling subscriber. This is effected exactly as in the arrangement of Figure 1 and hence will not be described again.

When the calling subscriber has dialled the number of the called subscriber the pulses representing the digits dialled are stored in the allotted register as previously described and the pulse representative of the number of the called subscriber in his group of subscribers appears at that one of the output terminals $T_1$ to $T_{20}$ which corresponds to the number of the multiplex switching unit to which the called subscriber is connected.

In the present example it is assumed that the multiplex switching unit 239 to which the called subscriber is connected is number three multiplex switching unit and hence the pulse appears at the output terminal $T_3$ of the register used. This terminal is connected to one of the input terminals $TI_1$ to $TI_5$ of the trunk allotter 24'. It is arranged that the pulse applied to the trunk allotter 24' is transmitted simultaneously back through the multiplex switching unit 12 to the line terminating unit of the calling subscriber 10 and serves to set the pulse generator 40 therein to a phase corresponding to that of a free speech channel in the same manner as that previously described with reference to Figure 1. The pulse applied in this way is also applied through the open one of the gates 244 to 253 to the corresponding free trunk terminating unit which is assumed to be that shown at 242. As the pulse applied to the trunk terminating unit 242 occurs simultaneously with that transmitted back to the calling subscribers line terminating unit the pulse generator 75 in the trunk terminating unit 242 has its phase adjusted to the same phase as the pulse generator in the line terminating unit 13.

The pulse appearing at the output of the trunk allotter 24' is also applied through connection 256 to the trunk terminating unit 243 connected to the trunk terminating unit 242 and associated with the multiplex switching unit 239. This pulse applied to the trunk terminating unit 243 serves to adjust the phase of the pulse generator 75 therein to that of a free channel in the multiplex switching unit 239. The pulse appearing at the output terminal 246' also appears at the terminal 65' but not at the terminal 65''. The pulse appearing at the terminal 65' is transmitted through the gate 255 to the subscribers line terminating unit associated with the multiplex switching unit 239. This pulse is accepted by the gate 67 in only one of the line terminating units, that one being the line terminating unit to which the appropriate P and Q pulses are also applied. In the present example it will be assumed that this terminating unit is the unit 241. Thus as the pulses applied to the units 241 and 243 from the trunk allotter occur simultaneously the phases of the generators 40 and 75 in these two units are adjusted to the same phase.

The manner in which ringing current is applied to the line of the called subscriber at 240 is the same as already described with reference to Figure 1.

Referring again to Figure 8 which shows a register, the connections to the gate 211 are those used when the register is one of the five connected to the first multiplex switching unit, that is to say the multiplex switching unit which has subscribers numbers 0000 to 0499 associated therewith. Thus the gate is opened by the storage of the digit "0" in the device 136. As the line 189 is connected to the gate 211 all pulses appearing in this line pass through the gate 211. It will be seen however that the only pulses to pass through the line 189 are those which pass through gates 179, 181, 183, 185 and 187. These five gates are controlled by the units 0, 1, 2, 3 and 4 respectively in the counter device 136.

If the register is associated with the number 2 multiplex switching unit which has subscribers 0500 to 0999 connected thereto the connection 257 to the gate 211 is omitted and a connection 258 shown in broken lines is made from the line 200 to the gate 211. Thus the connection from the counter device 136 to the gate 211 is determined by the first digit in the numbers of the subscribers connected to the multiplex switching unit with which the register is associated. If the second digit is four or less connection 257 is made to the gate 211. If the second digit is in the range 5 to 9 the connection 257 is omitted and connection 258 is made to to the gate 211.

Referring now to Figure 11 this is a circuit diagram showing in more detail the trunk allotter 24'. The terminals $TI_1$ to $TI_5$ are connected to a gate 259 which is a combining gate and merely enables the inputs applied from any of the input terminals to appear at an output terminal 260. The input terminals $TI_6$ to $TI_{10}$ are connected to a further combining gate 261 whose output terminal is at 262. The terminals 260 and 262 are connected through a further combining gate 263 to a common line 264. The outputs at the terminals 260 and 262 are also applied through gates 265 and 266 respectively to the terminals 65' and 65'' which correspond with the terminals of the same reference in Figure 10. The gates 265 and 266 are of the type which open only when voltage is absent from the control terminals 267 and 268 respectively therein.

Of the ten gates shown in block form in Figure 10 only two are shown at 244 and 246 in Figure 11. All of these ten gates are identical. A further gate 216 identical with the gate of the same reference in Figure 9 is also provided. The gates 244 to 253 are, as will be seen, substantially the same as the gates 54 to 63 in Figure 9 the principal difference being that whereas in Figure 9 each gate has two output terminals in the arrangement of Figure 11 each gate has only one output terminal such as 246'. The function of the circuit of Figure 11 will be apparent from the description of Figure 9. The function of the two gates 265 and 266 is to ensure that a combined P and Q pulse applied at any of the terminals $TI_1$ to $TI_5$ does not pass to the subscribers line terminating units connected to the multiplex switching unit 12, and similarly to ensure that a combined P and Q pulse applied to any of the terminals $TI_6$ to $TI_{10}$ does not pass to the subscribers line terminating units connected to the multiplex switching unit 239 in the event of a subscriber on the multiplex switching unit 239 calling a subscriber on the multiplex switching unit 12. Secondly the gates 265 and 266 prevent any pulses from appearing at the terminals 65' and 65'' whenever all ten of the gates 244 to 253 are inhibited because of all ten of the trunks associated therewith being busy. This second function is effected by means of the potential of the cathode of the valve 227. It will be appreciated that this potential is normally earth potential so long as the valve 227 is extinguished. If all ten of the gates 244 to 253 are inhibited the valve 227 remains struck and hence the potential of the cathode of the valve 227 and the terminals 267 and 268 connected thereto remains positive whereby the gates 265 and 266 remain closed.

For the purpose of clearing the digit, counters 135 to 139 of Figure 8 and hence to clear the register for use in making a further call the HT supply to the digit counters may be made through the contacts of a relay (not shown). The relay winding may be arranged to become energised only when carrier pulses are applied to the demodulator in the modulator/demodulator associated with the register. The current supply for the relay may be derived from the low-pass filter in the demodulator by means of a transformer and rectifier as shown in Figure 6 on page 186 of the Proceedings of the Institution of Electrical Engineers, part 1, No. 119, September 1952. The same method may be employed to provide the output voltage on the connection 84 in the subscribers' line circuits.

I claim:

1. An automatic telephone system comprising a plurality of subscribers' line terminating units, a lesser plurality of trunk terminating units, a common transmission link connecting the subscribers' line terminating units to the trunk terminating units, each of the line and trunk terminating units including an adjustable modulator and an adjustable receiver, the trunk terminating units being connected in pairs with the output of the receiver in each trunk terminating unit in a pair connected to the input of the modulator in the other trunk terminating unit in the pair, and control apparatus responsive to a calling signal from a calling subscriber for automatically establishing a speech channel path in the transmission link between the calling and a called subscriber in which speech signals are transmitted in one of a plurality of speech channels between the calling subscriber's line terminating unit and one of a selected pair of trunk terminating units and in another of the said plurality of speech channels between the called subscriber's line terminating unit and the other of the pair of trunk terminating units, the control apparatus comprising a trunk allotter for selecting a pair of disengaged trunk terminating units, a speech channel allotter generating signals representative of free speech channels, and control means responsive to said calling signal from the calling subscriber and to the signals from the said speech channel allotter to adjust the modulators and receivers of the called subscriber's line terminating unit and one of the selected pair of trunk terminating units to transmit and receive speech signals in an allotted one of the free speech channels and to adjust the modulators and receivers of the calling subscriber's line terminating unit and the other of the selected pair of trunk terminating units to transmit and receive signals in another allotted free speech channel.

2. An automatic telephone system according to claim 1 wherein the control means comprises means for initially adjusting the modulator in any calling subscriber's line terminating unit to transmit to the link the calling signal in a further channel, a register incorporating a receiver preset to receive from the link signals in the said further channel and in response thereto to generate an output voltage having a characteristic identifying the called subscriber, means responsive to said output voltage and to the signals from the speech channel allotter to adjust the modulators and receivers of the called subscriber's line terminating unit and one of the selected pair of trunk terminating units to transmit and receive speech signals in an allotted one of the free speech channels and to adjust the modulators and receivers of the calling subscriber's line terminating unit and the other of the selected pair of trunk terminating units to transmit and receive sigals in another allotted free speech channel, and means for rendering the register free to establish another call.

3. An automatic telephone system according to claim 1 wherein the control means comprises a plurality of registers incorporating receivers respectively preset to receive from the link signals in predetermined ones of a plurality of further channels, a register allotter generating output signals representative of the channel associated with a free one of the plurality of registers, means responsive to the output signals from the register allotter to adjust the modulator of any calling subscriber's line terminating unit to transmit to the link signals in the channel of a free register, the register in response to calling signals received by the associated receiver generating an output voltage having a characteristic identifying the called subscriber, means responsive to said output voltage and to the signals from the speech channel allotter to adjust the modulators and receivers of the called subscriber's line terminating unit and one of the selected pair of trunk terminating units to transmit and receive speech signals in an allotted one of the free speech channels and to adjust the modulators and receivers of the calling subscriber's line terminating unit and the other of the selected pair of trunk terminating units to transmit and receive signals in another allotted free speech channel, and means for rendering the register free to establish another call.

4. An automatic telephone system according to claim 3 wherein the means responsive to the output voltage from an engaged register comprises means associated with the trunk allotter to apply said output voltage to one of a pair of trunk teminating units selected by the trunk allotter and after a delay to the other of the selected pair of trunk terminating units, means in the said one of the selected pair of trunk terminating units responsive to the applied output voltage and to the signals from the speech channel allotter to adjust the modulator and receiver therein to transmit to and receive from the link signals in an allotted one of the speech channels, means in the said other of the selected pair of trunk terminating units responsive to the applied output voltage and to the signals from the speech channel alloter to adjust the modulator and receiver therein to transmit to and receive from the link signals in another allotted one of the speech channels, means for applying the said output voltage to each line terminating unit, means in the called subscriber's line terminating unit responsive to the said applied output voltage and to the signals from the speech channel allotter to adjust the modulator and receiver therein to transmit to and receive from the link signals in one of the speech channels allotted to the selected pair of trunk terminating units, and means in the calling subscriber's line terminating unit responsive to a control voltage transmitted through the link from the engaged register in the channel of the engaged register and to the signals from the speech channel allotter to adjust the modulator and receiver therein to transmit to and receive from the link signals in the other of the speech channels allotted to the selected pair of trunk terminating units.

5. An automatic telephone system according to claim 4 wherein the speech and register channels are in the form of time-interlaced trains of pulses.

6. An automatic telephone system according to claim 5 wherein each receiver is in the form of a gated pulse demodulator and pulses are applied thereto and to the associated modulator from a variable-phase pulse generator associated therewith.

7. An automatic telephone system according to claim 6 wherein the output voltage from the register is in the form of a pulse, the pulses generated in response to different calling signals having different times of occurrence.

8. An automatic telephone system comprising a first and a second plurality of subscribers' line terminating units, a first common transmission link, a first plurality of trunk terminating units, the first plurality of subscriber's line terminating units being connected by said first link to said first plurality of trunk terminating units, a second common transmission link, a second plurality of trunk terminating units, the second plurality of subscriber's line terminating units being connected by said second link to said second plurality of trunk terminating units, each of the line and trunk terminating units including an adjustable modulator and an adjustable receiver, each plurality of trunk terminating units comprising three groups, the units in two of the three groups in each plurality of trunk terminating units being connected together in pairs, each such pair comprising a unit from each of the two groups and being connected together with the output of the receiver in each unit of each pair connected to the input of the modulator in the other unit of the pair, the units in the third group of the first plurality of trunk terminating units and the units in the third group of the second plurality of trunk terminating units also being connected together in pairs, each such latter pair comprising a unit from each group and being connected together with the output of the receiver in the unit of each latter pair connected to the input of the modulator in the other unit of the latter pair, and control apparatus responsive to a calling signal from any calling subscriber for automatically establishing a speech channel path between the calling and a called subscriber, the control apparatus comprising a trunk allotter for selecting a disengaged pair of trunk terminating units one of which is connected to the link serving the calling subscriber and the other of which is connected to the link serving the called subscriber, a speech channel allotter generating signals representative of free speech channels in the links, and control means responsive to said calling signal from the calling subscriber and to the signals from the said speech channel allotter to adjust the modulators and receivers in the called subscriber's line terminating unit and one of the selected pair of trunk terminating units to transmit and receive speech signals in a free one of the speech channels in the link serving the called subscriber and to adjust the modulators and receivers in the calling subscriber's line terminating unit and the other of the selected pair of trunk terminating units to transmit and receive speech signals in a free one of the speech channels in the link serving the calling subscriber.

9. An automatic telephone system according to claim 8 wherein the control means comprises means associated with each link for initially adjusting the modulator in any calling subscriber's line terminating unit to transmit to the link the calling signal in a further channel, a register incorporating a receiver preset to receive from the link signals in the said further channel and in response thereto to generate at an output terminal characteristic of the link to which the called subscriber is connected an output voltage having a characteristic identifying the called subscriber, means responsive to said output voltage and to the signals from the speech channel allotter to adjust the modulators and receivers in the called subscriber's line terminating unit and one of the selected pair of trunk terminating units to transmit and receive speech signals in a free one of the speech channels in the link serving the called subscriber and to adjust the modulators and receivers in the calling subscriber's line terminating unit and the other of the selected pair of trunk terminating units to transmit and receive speech signals in a free one of the speech channels in the link serving the calling subscriber.

10. An automatic telephone system according to claim 8 wherein the control means comprises a plurality of registers associated with each link and incorporating receivers respectively preset to receive from the link signals in predetermined different ones of a plurality of further channels, a register allotter associated with each link generating output signals representative of the channel associated with a free one of the plurality of registers, means associated with each link responsive to the output signals from the register allotter to adjust the modulator of any calling subscriber's line terminating unit to transmit to the link signals in the channel of a free register, the register in response to the calling signals received by the associated receiver generating at an output terminal characteristic of the link to which the called subscriber is connected an output voltage having a characteristic identifying the called subscriber, and means responsive to said output voltage and to the signals from the speech channel allotter to adjust the modulators and receivers in the called subscriber's line terminating unit and one of the selected pair of trunk terminating units to transmit and receive speech signals in a free one of the speech channels in the link serving the called subscriber and to adjust the modulators and receivers in the calling subscriber's line terminating unit and the other of the selected pair of trunk terminating units to transmit and receive speech signals in a free one of the speech channels in the link serving the calling subscriber.

11. An automatic telephone system according to claim 10 wherein the means responsive to the output voltage from the engaged register comprises means associated with the trunk allotter to apply the output voltage to one of a pair of trunk terminating units selected by the trunk allotter as being disengaged and connecting the link of the called subscriber to the link of the calling subscriber, and after a delay to the other of the selected pair of trunk terminating units, means in the said one of the selected pair of trunk terminating units responsive to the applied output voltage and to the signals from the speech channel allotter to adjust the modulator and receive therein to transmit to and receive from the associated link signals in an allotted one of the speech channels, means in the said other of the selected pair of trunk terminating units responsive to the applied output voltage and to the signals from the speech channel allotter to adjust the modulator and receiver therein to transmit to and receive from the associated link signals in another allotted one of the speech channels, means for applying the said output voltage to each line terminating unit connected to the link serving the called subscriber, means in the called subscriber's line terminating unit responsive to the said applied output voltage and to the signals from the speech channel allotter to adjust the modulator and receiver therein to transmit to and receive from the link signals in one of the speech channels allotted to the selected pair of trunk terminating units, and means in the calling subscriber's line terminating unit responsive to a control voltage transmitted through the link from the engaged register in the channel of the engaged register and to the signals from the speech channel allotter to adjust the modulator and receiver therein to transmit to and receive from the link signals in the other of the speech channels allotted to the selected pair of trunk terminating units.

12. An automatic telephone system according to claim 11 wherein the speech and register channels are in the form of time-interlaced trains of pulses.

13. An automatic telephone system according to claim 12 wherein each receiver is in the form of a gated pulse demodulator and pulses are applied thereto and to the associated modulator from a variable-phase pulse generator associated therewith.

14. An automatic telephone system according to claim 13 wherein the output voltage from the register is in the form of a pulse, the pulses generated in response to different calling signals having different times of occurrence.

References Cited in the file of this patent

UNITED STATES PATENTS

| | | |
|---|---|---|
| 2,490,833 | Ransom | Dec. 13, 1949 |
| 2,520,170 | Ransom | Aug. 29, 1950 |